United States Patent
Ota et al.

(10) Patent No.: US 10,115,970 B2
(45) Date of Patent: Oct. 30, 2018

(54) SEMI-SOLID ELECTRODES WITH POROUS CURRENT COLLECTORS AND METHODS OF MANUFACTURE

(71) Applicant: 24M Technologies, Inc., Cambridge, MA (US)

(72) Inventors: Naoki Ota, Lexington, MA (US); Taison Tan, Cambridge, MA (US); Takaaki Fukushima, Okayama (JP); Naoaki Yamaguchi, Kagoshima (JP); Hiromitsu Mishima, Kirishima (JP)

(73) Assignee: 24M Technologies, Inc., Cambridge, MA (US)

( * ) Notice: Subject to any disclaimer, the term of this patent is extended or adjusted under 35 U.S.C. 154(b) by 289 days.

(21) Appl. No.: 15/097,838

(22) Filed: Apr. 13, 2016

(65) Prior Publication Data

US 2016/0308218 A1 Oct. 20, 2016

Related U.S. Application Data

(60) Provisional application No. 62/147,323, filed on Apr. 14, 2015.

(51) Int. Cl.
*H01M 4/74* (2006.01)
*H01M 4/36* (2006.01)
(Continued)

(52) U.S. Cl.
CPC .......... *H01M 4/747* (2013.01); *H01M 4/661* (2013.01); *H01M 4/13* (2013.01); *H01M 4/667* (2013.01)

(58) Field of Classification Search
CPC ............ H01M 4/74; H01M 4/13; H01M 4/66; H01M 4/36
See application file for complete search history.

(56) References Cited

U.S. PATENT DOCUMENTS

| 2,208,028 A | 7/1940 | Harrington |
|---|---|---|
| 3,624,628 A | 11/1971 | Schmidt |

(Continued)

FOREIGN PATENT DOCUMENTS

| CN | 1354529 | 6/2002 |
|---|---|---|
| CN | 101212070 | 7/2008 |

(Continued)

OTHER PUBLICATIONS

Office Action for U.S. Appl. No. 13/607,021, dated Apr. 20, 2015, 8 pages.

(Continued)

*Primary Examiner* — Kenneth J Douyette
(74) *Attorney, Agent, or Firm* — Cooley LLP

(57) ABSTRACT

A semi-solid electrode includes a first porous substrate and a second porous substrate stacked together to form a current collector, and a semi-solid electrode material embedded in the current collector. The semi-solid electrode material includes a suspension of an active material and a conductive material disposed in a non-aqueous liquid electrolyte. The porous substrates are at least partially disposed within the suspension such that the suspension substantially encapsulates the porous substrates. Each porous substrate in the current collector defines a pitch, and the two pitches of the two porous substrates in the current collector can be shifted with respect to each other by 30% to 70% of the pitch so as to reduce polarization effect.

18 Claims, 23 Drawing Sheets

(51) Int. Cl.
    *H01M 4/66*    (2006.01)
    *H01M 4/13*    (2010.01)

(56) References Cited

U.S. PATENT DOCUMENTS

| | | | |
|---|---|---|---|
| 4,105,815 A | 8/1978 | Buckler | |
| 4,199,912 A | 4/1980 | James, Jr. et al. | |
| 4,386,019 A | 5/1983 | Kann et al. | |
| 4,695,355 A | 9/1987 | Koziol | |
| 4,818,643 A | 4/1989 | Cook et al. | |
| 4,925,752 A | 5/1990 | Fauteux et al. | |
| 5,316,556 A | 5/1994 | Morris | |
| 5,674,556 A | 10/1997 | Fukumura et al. | |
| 5,697,145 A | 12/1997 | Fukumura et al. | |
| 5,725,822 A | 3/1998 | Keller et al. | |
| 5,749,927 A | 5/1998 | Chern et al. | |
| 5,792,576 A | 8/1998 | Xing et al. | |
| 5,834,052 A | 11/1998 | Fukumura et al. | |
| 5,837,397 A | 11/1998 | Xing | |
| 6,207,322 B1 | 3/2001 | Kelsey et al. | |
| 6,264,707 B1 | 7/2001 | Ishikawa et al. | |
| 6,284,192 B1 | 9/2001 | Coonan et al. | |
| 6,287,722 B1 | 9/2001 | Barton et al. | |
| 6,291,091 B1 | 9/2001 | Preischl et al. | |
| 6,403,262 B1 | 6/2002 | Xing et al. | |
| 6,503,432 B1 | 1/2003 | Barton et al. | |
| 6,576,365 B1* | 6/2003 | Meitav | H01M 10/0436 29/623.1 |
| 6,589,299 B2 | 7/2003 | Missling et al. | |
| 6,939,383 B2 | 9/2005 | Eastin et al. | |
| 6,986,967 B2 | 1/2006 | Barton et al. | |
| 7,338,734 B2 | 3/2008 | Chiang et al. | |
| 7,700,019 B2 | 4/2010 | Lavoie et al. | |
| 8,722,226 B2 | 5/2014 | Chiang et al. | |
| 8,722,227 B2 | 5/2014 | Chiang et al. | |
| 8,778,552 B2 | 7/2014 | Chiang et al. | |
| 8,993,159 B2 | 3/2015 | Chiang et al. | |
| 9,153,833 B2 | 10/2015 | Chiang et al. | |
| 9,178,200 B2 | 11/2015 | Bazzarella et al. | |
| 9,184,464 B2 | 11/2015 | Chiang et al. | |
| 9,203,092 B2 | 12/2015 | Slocum et al. | |
| 9,293,781 B2 | 3/2016 | Chiang et al. | |
| 9,362,583 B2 | 6/2016 | Chiang et al. | |
| 9,385,392 B2 | 7/2016 | Chiang et al. | |
| 9,401,501 B2 | 7/2016 | Bazzarella et al. | |
| 9,437,864 B2 | 9/2016 | Tan et al. | |
| 9,484,569 B2 | 11/2016 | Doherty et al. | |
| 9,825,280 B2 | 11/2017 | Chiang et al. | |
| 2001/0021471 A1 | 9/2001 | Xing et al. | |
| 2002/0106561 A1 | 8/2002 | Lee et al. | |
| 2004/0029008 A1 | 2/2004 | Winterberg et al. | |
| 2005/0064270 A1 | 3/2005 | Marionowski | |
| 2008/0096110 A1 | 4/2008 | Bito et al. | |
| 2008/0289676 A1 | 11/2008 | Guidotti et al. | |
| 2009/0023041 A1 | 1/2009 | Cooper | |
| 2009/0117457 A1* | 5/2009 | Davis | H01M 4/13 429/163 |
| 2010/0047671 A1 | 2/2010 | Chiang et al. | |
| 2010/0112454 A1 | 5/2010 | Visco et al. | |
| 2010/0196800 A1 | 8/2010 | Markoski et al. | |
| 2010/0227208 A1* | 9/2010 | Kim | H01M 2/0227 429/94 |
| 2010/0323264 A1 | 12/2010 | Chiang et al. | |
| 2011/0086258 A1 | 4/2011 | Yaginuma et al. | |
| 2011/0159375 A1* | 6/2011 | Feaver | H01G 11/34 429/302 |
| 2011/0189520 A1 | 8/2011 | Carter et al. | |
| 2011/0200848 A1 | 8/2011 | Chiang et al. | |
| 2011/0274948 A1 | 11/2011 | Duduta et al. | |
| 2012/0164499 A1 | 6/2012 | Chiang et al. | |
| 2013/0055559 A1 | 3/2013 | Slocum et al. | |
| 2013/0065122 A1 | 3/2013 | Chiang et al. | |
| 2013/0162216 A1* | 6/2013 | Zhamu | H01G 11/06 320/130 |
| 2013/0309547 A1 | 11/2013 | Bazzarella et al. | |
| 2013/0337319 A1 | 12/2013 | Doherty et al. | |
| 2014/0004437 A1 | 1/2014 | Slocum et al. | |
| 2014/0030623 A1 | 1/2014 | Chiang et al. | |
| 2014/0039710 A1 | 2/2014 | Carter et al. | |
| 2014/0154546 A1 | 6/2014 | Carter et al. | |
| 2014/0170524 A1 | 6/2014 | Chiang et al. | |
| 2014/0248521 A1 | 9/2014 | Chiang et al. | |
| 2014/0315097 A1 | 10/2014 | Tan et al. | |
| 2015/0024279 A1 | 1/2015 | Tan et al. | |
| 2015/0129081 A1 | 5/2015 | Chiang et al. | |
| 2015/0140371 A1 | 5/2015 | Slocum et al. | |
| 2015/0171406 A1 | 6/2015 | Bazzarella et al. | |
| 2015/0280267 A1 | 10/2015 | Chiang et al. | |
| 2015/0295272 A1 | 10/2015 | Chiang et al. | |
| 2015/0357626 A1 | 12/2015 | Holman et al. | |
| 2016/0013507 A1 | 1/2016 | Chiang et al. | |
| 2016/0056490 A1 | 2/2016 | Chiang et al. | |
| 2016/0056491 A1 | 2/2016 | Chiang et al. | |
| 2016/0105042 A1 | 4/2016 | Taylor et al. | |
| 2016/0126543 A1 | 5/2016 | Ota et al. | |
| 2016/0133916 A1 | 5/2016 | Zagars et al. | |
| 2016/0190544 A1 | 6/2016 | Slocum et al. | |
| 2016/0218375 A1 | 7/2016 | Chiang et al. | |
| 2016/0268621 A1 | 9/2016 | Chiang et al. | |
| 2016/0344006 A1 | 11/2016 | Ota et al. | |
| 2016/0372802 A1 | 12/2016 | Chiang et al. | |
| 2017/0018798 A1 | 1/2017 | Tan et al. | |
| 2017/0025646 A1 | 1/2017 | Ota et al. | |
| 2017/0025674 A1 | 1/2017 | Tan et al. | |
| 2017/0033389 A1 | 2/2017 | Chiang et al. | |
| 2017/0033390 A1 | 2/2017 | Chiang et al. | |
| 2017/0077464 A1 | 3/2017 | Bazzarella et al. | |
| 2017/0162863 A1 | 6/2017 | Doherty et al. | |
| 2017/0214034 A1 | 7/2017 | Ota et al. | |
| 2017/0237111 A1 | 8/2017 | Holman et al. | |
| 2017/0237112 A1 | 8/2017 | Hol | |
| 2017/0288281 A1 | 10/2017 | Chiang et al. | |

FOREIGN PATENT DOCUMENTS

| | | | |
|---|---|---|---|
| JP | 10255754 A * | 9/1998 | H01M 2/26 |
| JP | H11-111265 | 4/1999 | |
| JP | 2007-335283 | 12/2007 | |
| JP | 2010-062008 | 3/2010 | |
| JP | 2011-077269 | 4/2011 | |
| JP | 2011-524074 | 8/2011 | |
| WO | WO 2010/118060 | 10/2010 | |
| WO | WO2010/137415 | 12/2010 | |
| WO | WO 2012/024499 | 2/2012 | |
| WO | WO 2012/088442 | 6/2012 | |

OTHER PUBLICATIONS

Office Action for U.S. Appl. No. 13/607,021, dated Jul. 10, 2015, 4 pages.
International Search Report and Written Opinion for International Application No. PCT/US2012/054219, dated Feb. 21, 2013, 13 pages.
Notification of the First Office Action for Chinese Application No. 201280051582.5, dated Nov. 4, 2015, 19 pages.
Notification of the Second Office Action for Chinese Application No. 201280051582.5, dated Aug. 26, 2016, 7 pages.
Supplementary European Search Report for European Application No. 12830248.6, dated Mar. 6, 2016, 6 pages.
Office Action for European Application No. 12830248.6, dated Jan. 19, 2017, 5 pages.
Notice of Reasons for Rejection for Japanese Patent Application No. 2014-529905, dated Jun. 29, 2016, 9 pages.
Office Action for U.S. Appl. No. 13/606,986, dated Jan. 14, 2016, 14 pages.
Office Action for U.S. Appl. No. 13/606,986, dated Jun. 3, 2016, 18 pages.
Office Action for U.S. Appl. No. 13/606,986, dated Jan. 26, 2017, 16 pages.
International Search Report and Written Opinion for International Application No. PCT/US2012/054218, dated Feb. 15, 2013, 10 pages.

(56) References Cited

OTHER PUBLICATIONS

Armand, M. et al., "Conjugated dicarboxylate anodes for Li-ion batteries," Nature Materials, 8:120-125 (2009).
Bervas, M. et al., "Investigation of the Lithiation and Delithiation Conversion Mechanisms in a Bismuth Fluoride Nanocomposites," Journal of the Electrochemical Society, 153(4):A799-A808 (2006).
Chan, C. K. et al., "High-performance lithium battery anodes using silicon nanowires," Nature Nanotechnology, 3:31-35 (2008).
Duduta, M. et al., "Semi-Solid Lithium Rechargeable Flow Battery," Advanced Energy Materials. 1(4):511-516 (2011).
Li, H. et al., "Li-Storage via Heterogeneous Reaction in Selected Binary Metal Fluorides and Oxides," Journal of Electrochemical Society, 151(11):A1878-A1885 (2004).
Nakahara, K. et al. "Rechargeable batteries with organic radical cathodes," Chemical Physics Letters, 359:351-354 (2002).
Nishide, H. et al., "Organic radical battery: nitroxide polymers as a cathode-active material," Electrochimica Acta, 50:827-831 (2004).
Plitz, I. et al., "Structure and Electrochemistry of Carbon-Metal Fluoride Nanocomposites Fabricated by a Solid State Redox Conversion Reaction", Journal of the Electrochemical Society, 152(2):A307-A315 (2005).
Notification of the Third Office Action for Chinese Application No. 201280051582.5, dated Apr. 1, 2017, 6 pages.
Office Action for European Application No. 12830248.6, dated Nov. 2, 2017, 5 pages.
Notice of Reasons for Rejection for Japanese Patent Application No. 2014-529905, dated May 23, 2017, 4 pages.
Notice of Reasons for Rejection for Japanese Patent Application No. 2014-529905, dated Oct. 24, 2017, 3 pages.

\* cited by examiner

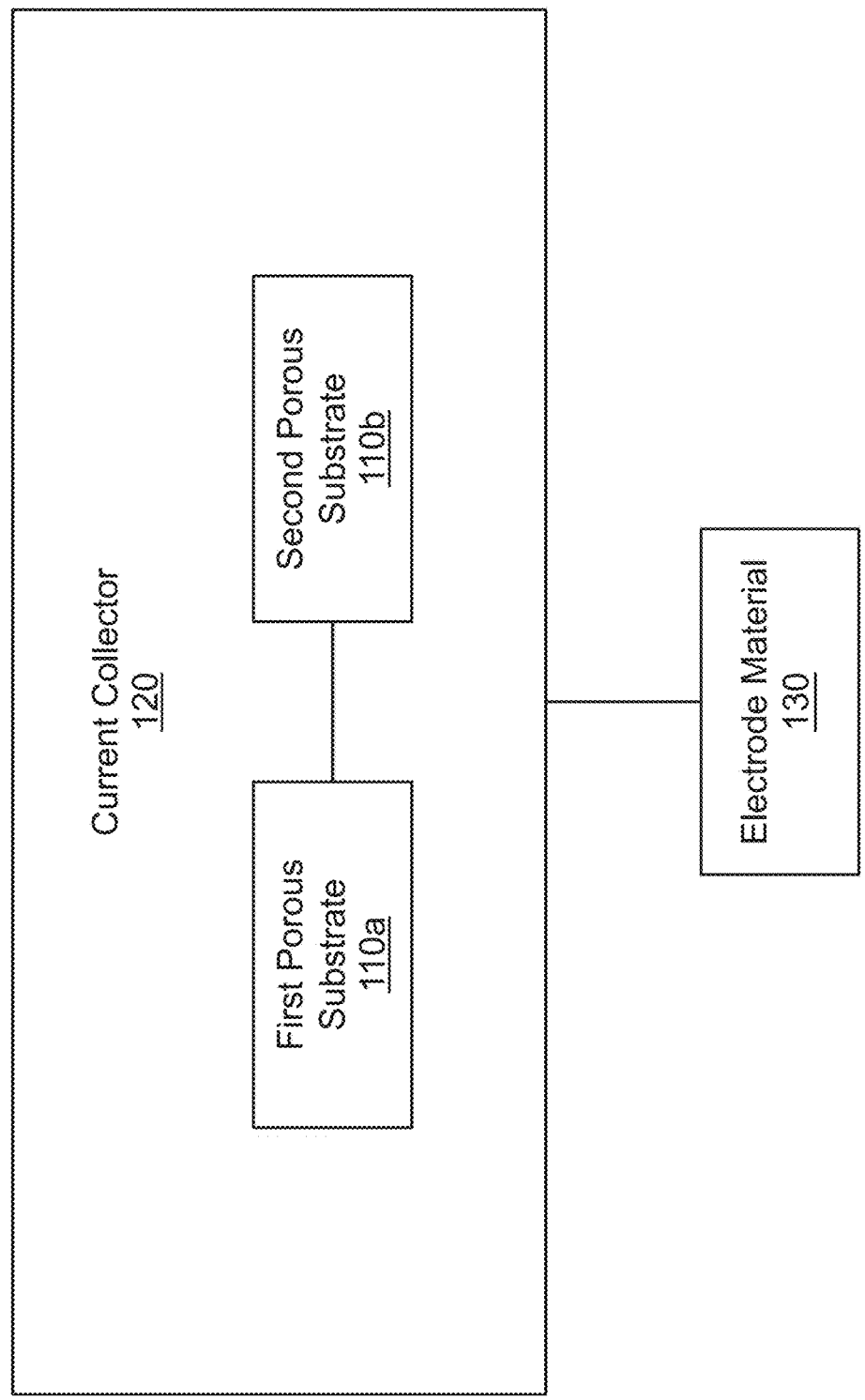

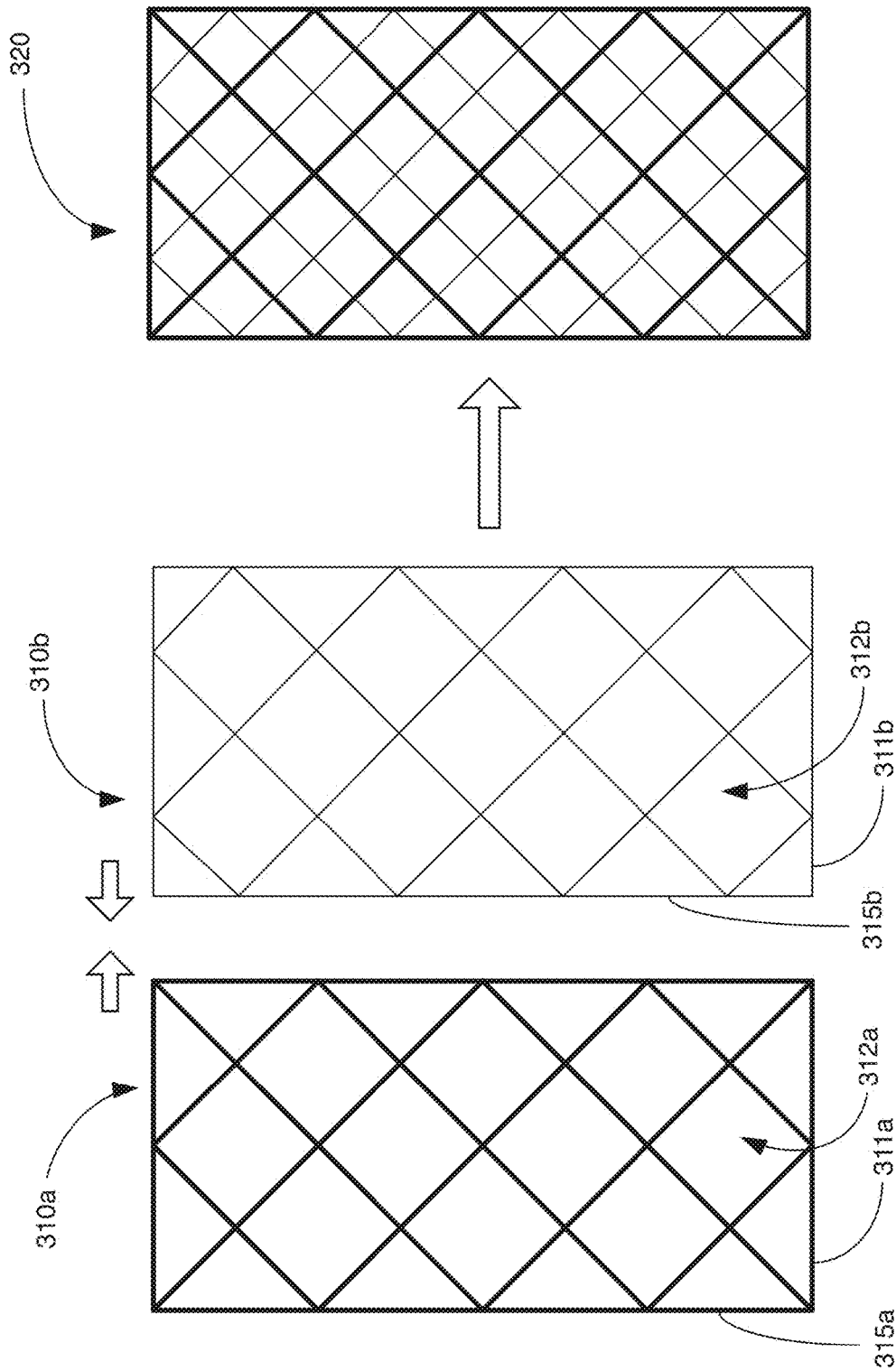

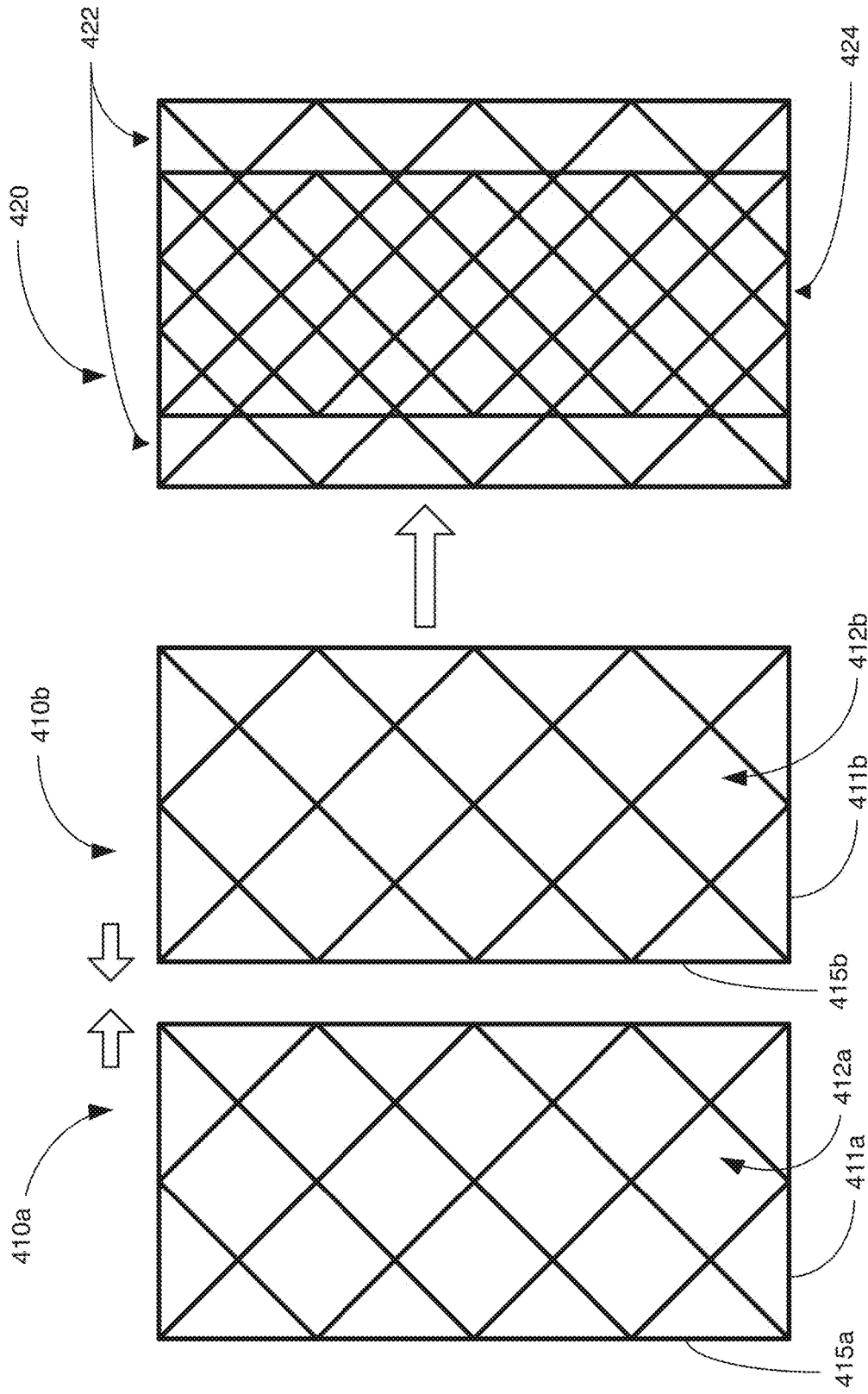

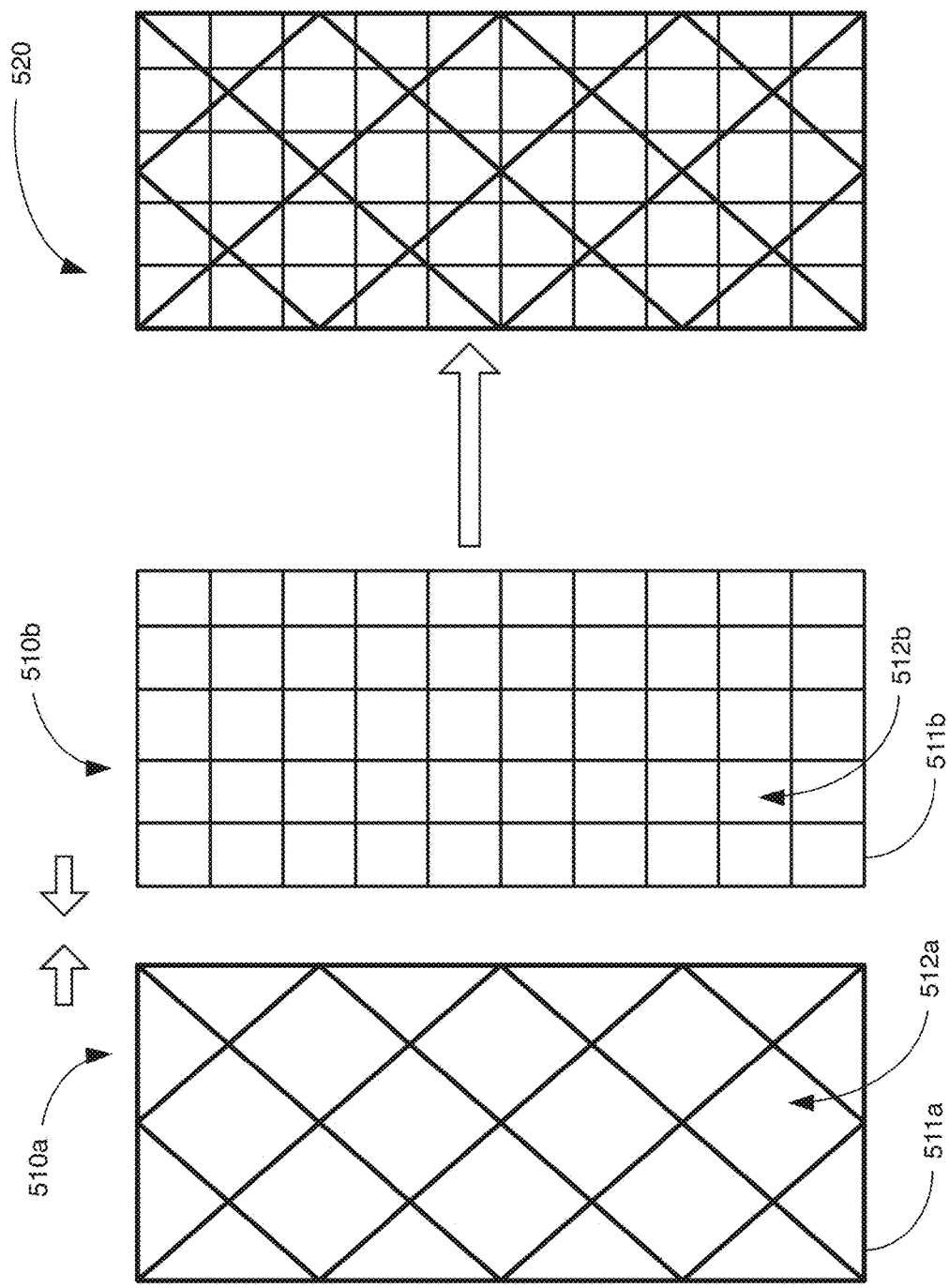

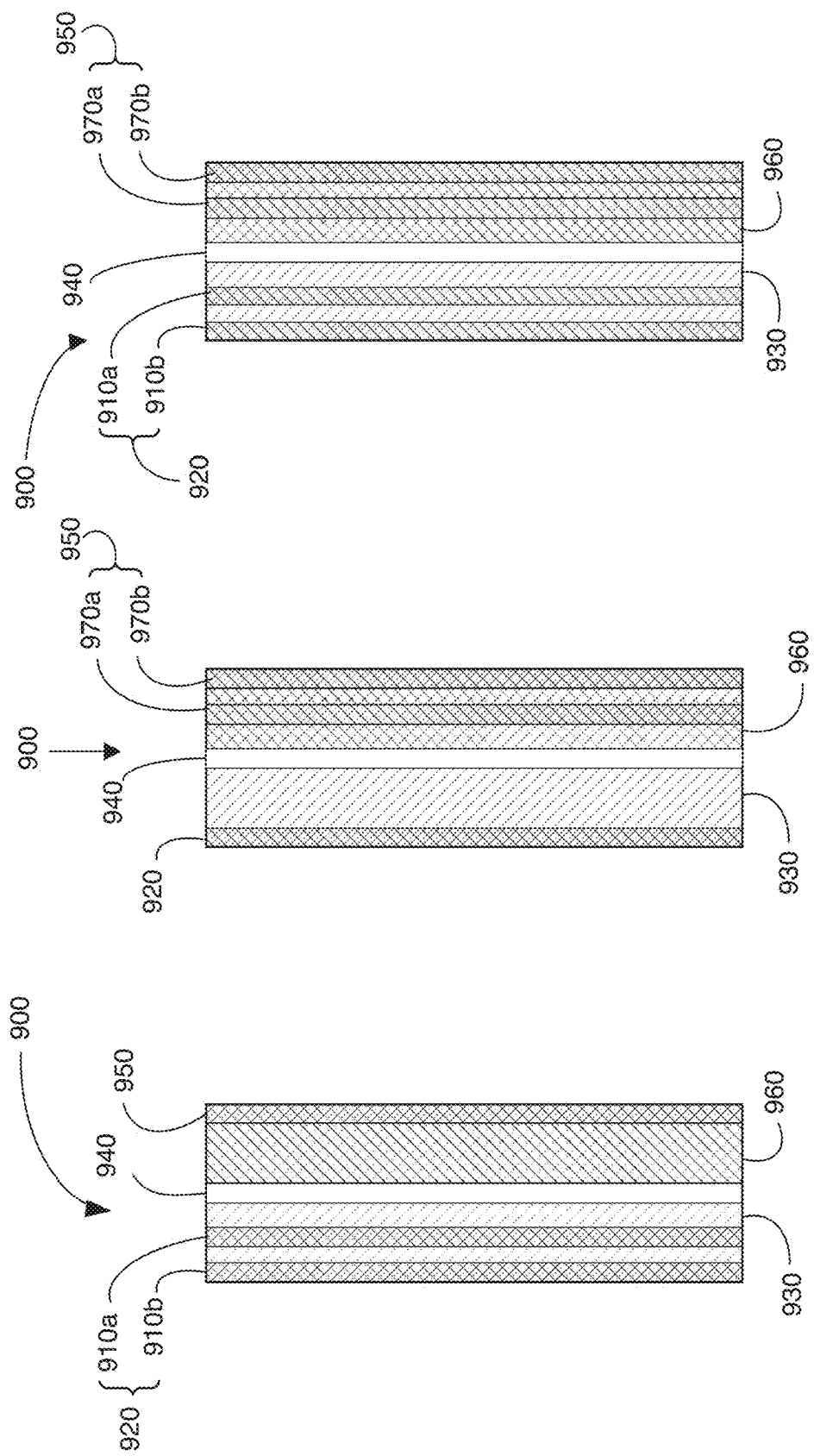

SEMI-SOLID ELECTRODES WITH POROUS CURRENT COLLECTORS AND METHODS OF MANUFACTURE

CROSS-REFERENCE TO RELATED APPLICATIONS

This application claims priority to and the benefit of U.S. Provisional Patent Application Ser. No. 62/147,323, entitled "Semi-Solid Electrodes with Porous Current Collectors and Methods of Manufacture," filed Apr. 14, 2015, the disclosure of which is hereby incorporated by reference in its entirety.

BACKGROUND

Embodiments described herein relate generally to the preparation of electrodes for use in electrochemical devices and more particularly to systems and methods of using a semi-solid electrode having a porous current collector.

A conventional rechargeable battery normally has a negative electrode comprising an active material which releases ions (e.g., lithium ions in Li-ion batteries) when discharging and intercalates or absorbs ions when the battery is being charged. The positive electrode of the battery can comprise an active material that is capable of reacting with the ions on discharge, and releasing the ions on charging the battery. In some batteries, the negative electrode is separated from the positive electrode by a separator, which is permeable to ionic flow but can prevent electric contact between the two electrodes. In order to have a high capacity, the active materials are normally a thick layer of particulate paste, and the electronic conductivity can be low. Therefore, a current collector is typically used to provide a conducting path through the paste and thereby reduce the resistance of the battery. The current collector can also act as a physical support for the active materials which otherwise would be a brittle structure. Conventional batteries also include an ion containing electrolyte, which may be either a non-aqueous liquid or a solid organic polymer and allows the flow of electrical charge between the two electrodes.

SUMMARY

Apparatus, systems, and methods described herein relate to the manufacture and use of a semi-solid electrode having a porous current collector. In some embodiments, an electrode includes a first porous substrate and a second porous substrate stacked together to form a current collector, and a semi-solid electrode material embedded in the first and second porous substrates. The semi-solid electrode material includes a suspension of an active material and optionally a conductive material in a non-aqueous liquid electrolyte. The first porous substrate defines a first pitch and the second porous substrate defines a second pitch. In some embodiments, stacking the first porous substrate and the second porous substrate for form the current collector reduces an internal resistance of an electrochemical cell including the electrode.

BRIEF DESCRIPTION OF THE DRAWINGS

FIG. 1 is a schematic illustration of a semi-solid electrode used in an electrochemical cell, according to an embodiment.

FIGS. 3A-3B are schematic illustrations of porous substrates stacked together to form a current collector, according to an embodiment.

FIGS. 4A-4B are schematic illustrations of porous substrates stacked together to form a current collector, according to an embodiment.

FIGS. 5A-5B are schematic illustrations of porous substrates stacked together to form a current collector, according to an embodiment.

FIGS. 9A-9C are schematic illustrations of electrochemical cells including semi-solid electrodes, according to various embodiments.

DETAILED DESCRIPTION

Figure 2A:
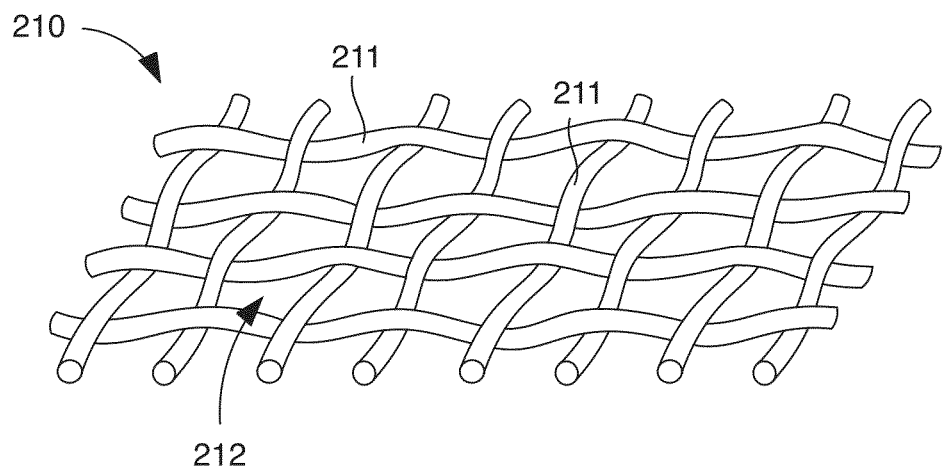
FIGS. 2A-2C are schematic illustrations of porous substrates used in a semi-solid electrode shown in FIG. 1, according to an embodiment.

Embodiments described herein relate generally to the preparation of electrodes for use in electrochemical devices and more particularly to systems and methods of using a semi-solid electrode having a stack of porous substrates as a current collector in electrochemical devices, such as batteries or electrochemical cells.

In some embodiments, an electrode includes a first porous substrate and a second porous substrate stacked together to form a current collector, and a semi-solid electrode material embedded in the first and second porous substrates. The semi-solid electrode material includes a suspension of an active material and optionally a conductive material in a non-aqueous liquid electrolyte. The first porous substrate defines a first pitch and the second porous substrate defines a second pitch. In some embodiments, the first porous substrate is shifted by about 30% to about 70% of the first pitch relative to the second porous substrate in the current collector to reduce polarization. In some embodiments, the first pitch is substantially different from the second pitch. In some embodiments, stacking the first porous substrate and the second porous substrate for form the current collector reduces an internal resistance of an electrochemical cell including the electrode.

In some embodiments, an electrochemical cell includes a cathode, an anode, and a separator disposed between the cathode and the anode. At least one of the cathode and the anode is a semi-solid electrode that includes a suspension of an active material and optionally a conductive material in a non-aqueous liquid electrolyte. The semi-solid electrode includes a plurality of porous substrates disposed therein to form a current collector such that the semi-solid electrode material substantially encapsulates the current collector. In some embodiments, each of the plurality of porous substrates includes aluminum, titanium, copper or combinations thereof. In some embodiments, at least one of the porous substrates in the current collector includes a porous base substrate coated with a conformal layer of carbon to improve the performance of the electrochemical cell.

As used herein, the term "semi-solid" refers to a material that is a mixture of liquid and solid phases, for example, such as a particle suspension, colloidal suspension, emulsion, gel, or micelle.

As used herein, the terms "condensed ion-storing liquid" or "condensed liquid" refers to a liquid that is not merely a solvent, as in the case of an aqueous flow cell catholyte or anolyte, but rather, that is itself redox-active. Of course, such a liquid form may also be diluted by or mixed with another, non-redox-active liquid that is a diluent or solvent, including mixing with such a diluent to form a lower-melting liquid phase, emulsion or micelles including the ion-storing liquid.

As used herein, the terms "about" and "approximately" generally include plus or minus 10% of the value stated. For example, about 5 would include 4.5 to 5.5, approximately 10 would include 9 to 11, and about 100 would include 90 to 110.

As used herein, the terms "activated carbon network" and "networked carbon" relate to a general qualitative state of an electrode. For example, an electrode with an activated carbon network (or networked carbon) is such that the carbon particles within the electrode assume an individual particle morphology and arrangement with respect to each other that facilitates electrical contact and electrical conductivity between particles. Conversely, the terms "unactivated carbon network" and "unnetworked carbon" relate to an electrode wherein the carbon particles either exist as individual particle islands or multi-particle agglomerate islands that may not be sufficiently connected to provide adequate electrical conduction through the electrode.

Typical battery manufacturing can involve numerous complex and costly processes carried out in series, each of which is subject to yield losses, incurs capital costs for equipment, and includes operating expenses for energy consumption and consumable materials. The process first involves making separate anodic and cathodic mixtures that are typically mixtures of electrochemically active ion storage compounds, electrically conductive additives, and polymer binders. The mixtures are coated onto the surfaces of flexible metal foils and subsequently compressed under high pressure to increase density and control thickness. These compressed electrode/foil composites are then slitted into sizes and/or shapes that are appropriate for the particular form factor of the manufactured battery. The slitted electrode composites are typically co-wound or co-stacked with intervening ionically-conductive/electronically-insulating separator membranes to construct battery windings, i.e., "jelly rolls" or "stacks," which are then packaged in metal cans, flexible polymer pouches, etc. The resulting cells can be infiltrated with liquid electrolyte in a carefully controlled environment.

Electrochemical devices (e.g., batteries) manufactured directly with a semi-solid suspension can reduce the manufacturing cost by, for example, avoiding the use of conventional binding agents and the electrode casting step altogether. Some benefits of the semi-solid electrodes approach include, for example: (i) a simplified manufacturing process with less equipment (i.e., less capital intensive), (ii) the ability to manufacture electrodes of different thicknesses and shapes (e.g., by changing an extrusion die slot dimension), (iii) processing of thicker (>100 µm) and higher areal charge capacity (mAh/cm$^2$) electrodes, thereby decreasing the volume, mass, and cost contributions of inactive components with respect to active material, and (iv) the elimination of binding agents, thereby reducing tortuosity and increasing ionic conductivity of the electrode. Examples of battery architectures utilizing semi-solid suspensions are described in International Patent Publication No. WO 2012/024499, entitled "Stationary, Fluid Redox Electrode," and International Patent Publication No. WO 2012/088442, entitled "Semi-Solid Filled Battery and Method of Manufacture," the entire disclosures of which are hereby incorporated by reference.

The stored energy or charge capacity of a manufactured battery can be related to several factors, including the inherent charge capacity of the active materials (mAh/g), the volume of the electrodes (cm$^3$), the product of the thickness, area, and number of layers, and the loading of active material in the electrode media (e.g., grams of active material/cubic centimeters of electrode media). Therefore, to enhance commercial appeal (e.g., increased energy density and decreased cost), it is generally desirable to increase areal charge capacity (mAh/cm$^2$) of the electrodes that are to be disposed in a given battery form factor, which depends on electrode thickness and active material loading.

After the manufactured battery is put into use, several factors may affect its performance. For example, electrochemically active materials, and correspondingly the semi-solid suspensions of which they are a part, can undergo volume change during charging and discharging. To the extent that the cell temperature changes, for example by way of ambient temperature or self-heating during operation, the electrode additionally experiences volume change associated with thermal expansion and contraction. Repetitive expansion and contraction may degrade the adhesion between the electrode material and the current collector, therefore inducing delamination—a common mechanism of battery performance decay. Delamination can be especially severe for electrode designs wherein the dominant contact between electrode media and current collector is through a facial area (e.g. a flat foil).

Another factor that can affect battery performance is the increase of battery internal resistance, which includes Ohmic resistance and polarization resistance. Ohmic resistance is dependent on electrode materials, electrolyte, separator resistance, and contact resistance on each interface. Polarization resistance originates from the polarization effect (deviation of electrode potential from equilibrium values) in an electrochemical reaction, and includes activation polarization and concentration polarization, induced resistance at the electrode-electrolyte junctions and the resistance in ion mobility through the electrolyte, respectively. Therefore, it is generally helpful to increase electrical conduction (i.e., reduce resistance) between the current collector and the electrode material. For example, it can be desirable to increase the surface area of the current collector that is in physical and/or electrical connection with the electrode material.

FIG. 1 shows a schematic view of an electrode that can address, at least in part, the above mentioned problems related to conventional batteries. The includes a first porous substrate 110a and a second porous substrate 110b (collectively referred to as porous substrates 110) stacked together to form a current collector 120, and a semi-solid electrode material 130 disposed in and/or on the porous substrates 110. The semi-solid electrode material 130 includes a suspension of an active material and optionally a conductive material in a non-aqueous liquid electrolyte. The first porous substrate 110a defines a first pitch, and the second porous substrate 110b defines a second pitch. The stacking of the first porous substrate 110a and the second porous substrate 110b is configured to reduce the internal resistance of electrochemical cells comprising such stacking.

Semi-Solid Composition

The semi-solid electrode material 130 shown in FIG. 1 can include both cathode and anode materials, which can be a flowable semi-solid or condensed liquid composition. A flowable anodic semi-solid material (also referred to herein as "anolyte") and/or a flowable cathodic semi-solid material (also referred to herein as "catholyte") are/is comprised of a suspension of electrochemically active materials (anode particulates and/or cathode particulates) and, optionally, electronically conductive materials (e.g., carbon) in an electrolyte. To be more specific, the cathodic materials and conductive materials are co-suspended in an electrolyte to produce a catholyte semi-solid. The anodic materials and conductive materials are co-suspended in an electrolyte to produce an anolyte semi-solid. The semi-solids are capable of flowing in response to an applied pressure differential, gravitational field, or other imposed acceleration field, that exerts or produces a force on the semi-solid, and optionally, with the aid of mechanical vibration.

In some embodiments, the electrochemically active materials can be particles (herein referred to as cathode or anode particles). The particles can have an effective diameter of at least 1 µm. In some embodiments, the cathode and/or anode particles have an effective diameter between approximately 1 µm and approximately 10 µm. In other embodiments, the cathode and/or anode particles have an effective diameter of at least 10 µm or more.

In some embodiments, a semi-solid electrode material (cathode or anode) can include about 20% to about 75% by volume of an active material. In some embodiments, a semi-solid electrode material (cathode or anode) can include about 35% to about 75% by volume, about 40% to about 75% by volume, about 45% to about 75% by volume, about 50% to about 75% by volume, about 55% to about 75% by volume, about 60% to about 75% by volume, or about 65% to about 75% by volume of an active material, inclusive of all ranges therebetween.

In some embodiments, the electrochemically active materials can have a polydisperse size distribution in order to increase the particle packing density and therefore the energy density of the semi-solid suspension, while still maintaining a flowable semi-solid. For example, the electrochemically active materials can include particles of various sizes and volume percentages, in which finest particles present in at least 5 vol % of the total volume, is at least a factor of 5 smaller than the largest particles present in at least 5 vol % of the total volume. In some embodiments, the electrochemically active materials can have a bidisperse size distribution (i.e., with two maxima in the distribution of particle number versus particle size) in which the two maxima differ in size by at least a factor of 5.

In some embodiments, the particles of the electrochemically active materials used in the semi-solid suspension are sufficiently large that surface forces do not prohibit them from achieving high tap density while dry, and high packing density when formulated into a semi-solid suspension. In some embodiments, the particle size is at least 1 µm. In other embodiments, the particle size is between approximately 1 µm and approximately 10 µm. In other embodiments, the particle size is at least 10 µm or more.

In some embodiments, the electrochemically active materials include particles with morphology that is at least equiaxed, and spherical, in order to increase the flowability and/or decrease the viscosity of the semi-solid suspension while simultaneously achieving high particle packing density. In some embodiments, the spherical particles are dense, and in other embodiments the spherical particles are porous. In some embodiments, the spherical particles are made by spray-drying a particle suspension to obtain spherical agglomerates of smaller particles.

In some embodiments, the electrochemically active materials include redox species that comprise, when taken in moles per liter (molarity), at least 10M concentration in the anolyte and/or catholyte semi-solids. In some embodiments, the anolyte and/or catholyte semi-solids can have at least 12M, at least 15M, or at least 20M. The electrochemically active material can be an ion storage material or any other compound or ion complex that is capable of undergoing Faradaic reaction in order to store energy. The electrochemically active material can also be a multiphase material including the redox-active solid mixed with a non-redox-active phase, including solid-liquid suspensions, or liquid-liquid multiphase mixtures, including micelles or emulsions having a liquid ion-storage material intimately mixed with a supporting liquid phase. Systems that utilize various working ions can include aqueous systems in which $H^+$ or $OH^+$ are the working ions, non-aqueous systems in which $Li^+$, $Na^+$, or other alkali ions are the working ions, even alkaline earth working ions such as $Ca^{2+}$ and $Mg^{2+}$, or $Al^+$. In each of these instances, a negative electrode storage material and a positive electrode storage material may be required, the negative electrode can store the working ion of interest at a lower absolute electrical potential than the positive electrode. The cell voltage can be determined approximately by the difference in ion-storage potentials of the two ion-storage electrode materials.

In some embodiments, the electrochemically active materials can include both negative and positive ion-storage materials, therefore producing no additional electrochemical byproducts in the cell. Both the positive and negative electrodes materials can be insoluble in the electrolyte, producing substantially no contamination in the electrolyte.

In some embodiments, the electrochemically active material can include a redox-active compound, which may be a condensed ion-storing liquid, organic or inorganic, and includes but is not limited to lithium metal, sodium metal, lithium-metal alloys, gallium and indium alloys with or without dissolved lithium, molten transition metal chlorides, thionyl chloride, and the like, or redox polymers and organics that are liquid under the operating conditions of the battery. Such a liquid form may also be diluted by or mixed with another, non-redox-active liquid that is a diluent or solvent, including mixing with such diluents to form a lower-melting liquid phase. However, unlike a conventional flow cell catholyte or anolyte, the redox-active component will comprise, by mass, at least 10% of the total mass of the flowable electrolyte. In some embodiments, the redox-active component will comprise, by mass, between approximately 10% and 25% of the total mass of the flowable electrolyte. In some embodiments, the redox-active component will comprise, by mass, at least 25% or more of the total mass of the flowable electrolyte.

In some embodiments, the electrochemically active material, whether used as a semi-solid or a condensed liquid format as defined above, can comprise an organic redox compound that stores the working ion of interest at a potential useful for either the positive or negative electrode of a battery. Such organic redox-active storage materials include "p"-doped conductive polymers such as polyaniline or polyacetylene based materials, polynitroxide or organic radical electrodes (such as those described in: H. Nishide et al., Electrochim. Acta, 50, 827-831, (2004), and K. Nakahara, et al., Chem. Phys. Lett., 359, 351-354 (2002)), carbonyl based organics, and oxocarbons and carboxylate, including compounds such as Li2C6O6, Li2C8H4O4, and Li2C6H4O4 (see for example M. Armand et al., Nature Materials, DOI: 10.1038/nmat2372) and organosulfur compounds.

In some embodiments, the electrochemically active materials can comprise organic redox compounds that are electronically insulating. In some instance, the redox compounds are in a condensed liquid phase such as liquid or flowable polymers that are electronically insulating. In such cases, the redox active slurry may or may not contain an additional carrier liquid. Additives can be combined with the condensed phase liquid redox compound to increase electronic conductivity. In some embodiments, such electronically insulating organic redox compounds are rendered electrochemically active by mixing or blending with particulates of an electronically conductive material, such as solid inorganic conductive materials including but not limited to metals, metal carbides, metal nitrides, metal oxides, and allotropes of carbon including carbon black, graphitic carbon, carbon fibers, carbon microfibers, vapor-grown carbon fibers (VGCF), activated carbon includes porous carbon, fullerenic carbons including "buckyballs", carbon nanotubes (CNTs), multiwall carbon nanotubes (MWNTs), single wall carbon nanotubes (SWNTs), graphene sheets or aggregates of graphene sheets, and materials comprising fullerenic fragments.

In some embodiments, the electrochemically active materials can include an electronically conductive polymer to render conductive the electronically insulating organic redox compounds. The conductive polymer can include but not limited to polyaniline or polyacetylene based conductive polymers or poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocence-substituted polyethylene, carbazole-substituted polyethylene, polyoxyphenazine, polyacenes, or poly(heteroacenes. The conductive additives form an electrically conducting framework within the insulating liquid redox compounds that significantly increases the electrically conductivity of the composition. In some embodiments, the conductive addition forms a percolative pathway to the current collector.

In some embodiments, the electrochemically active material can comprise a redox-active compound that is a sol or gel, including for example metal oxide sols or gels produced by the hydrolysis of metal alkoxides, amongst other methods generally known as "sol-gel processing." Vanadium oxide gels of composition $V_xO_y$ are amongst such redox-active sol-gel materials.

In some embodiments, the electrochemically active material can include fullerenic carbon including single-wall carbon nanotubes (SWNTs), multiwall carbon nanotubes (MWNTs), or metal or metalloid nanowires as ion-storage materials. One example is the silicon nanowires used as a high energy density storage material in a report by C. K. Chan, H. Peng, G. Liu, K. McIlwrath, X. F. Zhang, R. A. Huggins, and Y. Cui, High-performance lithium battery anodes using silicon nanowires, Nature Nanotechnology, published online 16 Dec. 2007; doi:10.1038/nnano.2007.411.

In some embodiments, the electrochemically active material can comprise the general family of ordered rocksalt compounds $LiMO_2$ including those having the $\alpha$-$NaFeO_2$ (so-called "layered compounds") or orthorhombic-$LiMnO_2$ structure type or their derivatives of different crystal symmetry, atomic ordering, or partial substitution for the metals or oxygen. M comprises at least one first-row transition metal but may include non-transition metals including but not limited to Al, Ca, Mg, or Zr. Examples of such compounds include $LiCoO_2$, $LiCoO_2$ doped with Mg, $LiNiO_2$, Li(Ni, Co, Al)$O_2$ (known as "NCA") and Li(Ni, Mn, Co)$O_2$ (known as "NMC"). Other families of exemplary electro-active materials includes those of spinel structure, such as $LiMn_2O_4$ and its derivatives, so-called "layered-spinel nanocomposites" in which the structure includes nanoscopic regions having ordered rocksalt and spinel ordering, olivines $LiMPO_4$ and their derivatives, in which M comprises one or more of Mn, Fe, Co, or Ni, partially fluorinated compounds such as $LiVPO_4F$, other "polyanion" compounds as described below, and vanadium oxides $V_xO_y$ including $V_2O_5$ and $V_6O_{11}$.

In some embodiments, the electrochemically active material can include a transition metal polyanion compound, for example as described in U.S. Pat. No. 7,338,734. In one or more embodiments the active material comprises an alkali metal transition metal oxide or phosphate, and for example, the compound has a composition $A_x(M'_{1-a}M''_a)_y(XD_4)_z$, $A_x(M'_{1-a}M''_a)_y(DXD_4)_z$, or $A_x(M'_{1-a}M''_a)_y(X_2D_7)_z$, and have values such that x, plus y(1-a) times a formal valence or valences of M', plus ya times a formal valence or valence of M", is equal to z times a formal valence of the $XD_4$, $X_2D_7$, or $DXD_4$ group; or a compound comprising a composition $(A_{1-a}M''_a)_xM'_y(XD_4)_z$, $(A_{1-a}M''_a)_xM'_y(DXD_4)_z(A_{1-a}M''_a)_x$ $M'_y(X_2D_7)_z$ and have values such that (1-a)x plus the quantity ax times the formal valence or valences of M" plus y times the formal valence or valences of M' is equal to z times the formal valence of the $XD_4$, $X_2D_7$, or $DXD_4$ group. In the compound, A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen. The positive active material can be an olivine structure compound $LiMPO_4$, where M is one or more of V, Cr, Mn, Fe, Co, and Ni, in which the compound is optionally doped at the Li, M or O-sites. Deficiencies at the Li-site are compensated by the addition of a metal or metalloid, and deficiencies at the O-site are compensated by the addition of a halogen. In some embodiments, the positive active material comprises a thermally stable, transition-metal-doped lithium transition metal phosphate having the olivine structure and having the formula $(Li_{1-x}Z_x)MPO_4$, where M is one or more of V, Cr, Mn, Fe, Co, and Ni, and Z is a non-alkali metal dopant such as one or more of Ti, Zr, Nb, Al, or Mg, and x ranges from 0.005 to 0.05.

In some embodiments, the electrochemically active material can include a lithium transition metal phosphate material having an overall composition of $Li_{1-x-z}M_{1+z}PO_4$, where M comprises at least one first row transition metal selected from the group consisting of Ti, V, Cr, Mn, Fe, Co and Ni, where x is from 0 to 1 and z can be positive or negative. M includes Fe, z is between about 0.15 and −0.15. The material can exhibit a solid solution over a composition range of 0<x<0.15, or the material can exhibit a stable solid solution over a composition range of x between 0 and at least about 0.05, or the material can exhibit a stable solid solution over a composition range of x between 0 and at least about 0.07 at room temperature (22-25° C.). The material may also exhibit a solid solution in the lithium-poor regime, e.g., where x≥0.8, or x≥0.9, or x≥0.95.

In some embodiments, the electrochemically active material can include a metal salt that stores an alkali ion by undergoing a displacement or conversion reaction. Examples of such compounds include metal oxides such as CoO, $Co_3O_4$, NiO, CuO, MnO, typically used as a negative electrode in a lithium battery, which upon reaction with Li undergo a displacement or conversion reaction to form a mixture of $Li_2O$ and the metal constituent in the form of a more reduced oxide or the metallic form. Other examples include metal fluorides such as $CuF_2$, $FeF_2$, $FeF_3$, $BiF_3$, $CoF_2$, and $NiF_2$, which undergo a displacement or conversion reaction to form LiF and the reduced metal constituent. Such fluorides may be used as the positive electrode in a lithium battery. In other embodiments the redox-active electrode material comprises carbon monofluoride or its derivatives. In some embodiments the material undergoing displacement or conversion reaction is in the form of particulates having on average dimensions of 100 nanometers or less. In some embodiments the material undergoing displacement or conversion reaction comprises a nanocomposite of the active material mixed with an inactive host, including but not limited to conductive and relatively ductile compounds such as carbon, or a metal, or a metal sulfide. $FeS_2$ and $FeF_3$ can also be used as cheap and electronically conductive active materials in a non-aqueous or aqueous lithium system.

In some embodiments, the electrochemically active material can include an ion storage compound, which can be, for example, amorphous carbon, disordered carbon, graphitic carbon, a metal-coated or metal-decorated carbon, a metal or metal alloy or metalloid or metalloid alloy, silicon, nanostructures including nanowires, nanorods, and nanotetrapods, or an organic redox compound.

In some embodiments, the electrochemically active material can include a working ion that is selected from the group consisting of $Li^+$, $Na^+$, $H^+$, $Mg^{2+}$, $Al^{3+}$, or $Ca^{2+}$. In some embodiments, the working ion is selected from the group consisting of $Li^+$ or $Na^+$. In some embodiments, the ion is proton or hydroxyl ion and the ion storage compound includes those used in a nickel-cadmium or nickel metal hydride battery.

In some embodiments, the ion is lithium and the ion storage compound can be selected from the group comprising metal fluorides, such as $CuF_2$, $FeF_2$, $FeF_3$, $BiF_3$, $CoF_2$, and $NiF_2$ and metal oxides, such as CoO, $Co_3O_4$, NiO, CuO, MnO.

In some embodiments, the ion is lithium and the ion storage compound includes an intercalation compound. The intercalation compound can have, for example, a general formula $Li_{1-x-z}M_{1-z}PO_4$, wherein M includes at least one first row transition metal selected from the group consisting of Ti, V, Cr, Mn, Fe, Co and Ni, wherein x is from 0 to 1 and z can be positive or negative. In another example, the intercalation compound can have a general formula $(Li_{1-x}Z_x)MPO_4$, where M is one or more of V, Cr, Mn, Fe, Co, and Ni, and Z is a non-alkali metal dopant such as one or more of Ti, Zr, Nb, Al, or Mg, and x ranges from 0.005 to 0.05. In yet another example, the intercalation compound can have a general formula $LiMPO_4$, where M is one or more of V, Cr, Mn, Fe, Co, and Ni, in which the compound is optionally doped at the Li, M or O-sites.

In some embodiments, the ion is lithium and the ion storage compound includes an intercalation compound selected from the group consisting of $A_x(M'_{1-a}M''_a)_y(XD_4)_z$, $A_x(M'_{1-a}M''_a)_y(DXD_4)_z$, and $A_x(M'_{1-a}M''_a)_y(X_2D_7)_z$, wherein x, plus y(1-a) times a formal valence or valences of M', plus ya times a formal valence or valence of M", is equal to z times a formal valence of the $XD_4$, $X_2D_7$, or $DXD_4$ group; and A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen.

In some embodiments, the ion is lithium and the ion storage compound includes an intercalation compound selected from the group consisting of $(A_{1-a}M''_a)_xM'_y(XD_4)_z$, $(A_{1-a}M''_a)_xM'_y(DXD_4)_z$ and $(A_{1-a}M''_a)_xM'_y(X_2D_7)_z$, where (1-a)x plus the quantity ax times the formal valence or valences of M" plus y times the formal valence or valences of M' is equal to z times the formal valence of the $XD_4$, $X_2D_7$ or $DXD_4$ group, and A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen.

In some embodiments, the ion is lithium and the ion storage compound includes an intercalation compound selected from the group consisting of ordered rocksalt compounds $LiMO_2$ including those having the α-$NaFeO_2$ and orthorhombic-$LiMnO_2$ structure type or their derivatives of different crystal symmetry, atomic ordering, or partial substitution for the metals or oxygen, where M includes at least one first-row transition metal but may include non-transition metals including but not limited to Al, Ca, Mg, or Zr.

In some embodiments, different electrochemically active materials can be used for the positive electrode and the negative electrode. In some embodiments, the electrochemically active material for the positive electrode can include a flowable semi-solid ion-storing redox composition including a solid selected from the group consisting of ordered rock-salt compounds $LiMO_2$ including those having the α-$NaFeO_2$ and orthorhombic-$LiMnO_2$ structure type or their derivatives of different crystal symmetry, atomic ordering, or partial substitution for the metals or oxygen, wherein M includes at least one first-row transition metal but may include non-transition metals including but not limited to Al, Ca, Mg, or Zr and the negative electrode includes a flowable semi-solid ion-storing redox composition including a solid selected from the group consisting of amorphous carbon, disordered carbon, graphitic carbon, or a metal-coated or metal-decorated carbon.

In some embodiments, the electrochemically active material for the positive electrode can include a flowable semi-solid ion-storing redox composition including a solid selected from the group consisting of $A_x(M'_{1-a}M''_a)_y(XD_4)_z$, $A_x(M'_{1-a}M''_a)_y(DXD_4)_z$, and $A_x(M'_{1-a}M''_a)_y(X_2D_7)_z$, and where x, plus y(1-a) times a formal valence or valences of M', plus ya times a formal valence or valence of M'', is equal to z times a formal valence of the $XD_4$, $X_2D_7$, or $DXD_4$ group, and A is at least one of an alkali metal and hydrogen, M' is a first-row transition metal, X is at least one of phosphorus, sulfur, arsenic, molybdenum, and tungsten, M'' any of a Group IIA, IIIA, IVA, VA, VIA, VIIA, VIIIA, IB, IIB, IIIB, IVB, VB, and VIB metal, D is at least one of oxygen, nitrogen, carbon, or a halogen and the negative electrode includes a flowable semi-solid ion-storing redox composition including a solid selected from the group consisting of amorphous carbon, disordered carbon, graphitic carbon, or a metal-coated or metal-decorated carbon.

In some embodiments, the electrochemically active material for the positive electrode includes a flowable semi-solid ion-storing redox composition including a compound with a spinel structure.

In some embodiments, the electrochemically active material for the positive electrode includes a flowable semi-solid ion-storing redox composition including a compound selected from the group consisting of $LiMn_2O_4$ and its derivatives; layered-spinel nanocomposites in which the structure includes nanoscopic regions having ordered rock-salt and spinel ordering; so-called "high voltage spinels" with a potential vs. Li/Li$^+$ that exceeds 4.3V including but not limited to $LiNi_{0.5}Mn_{1.5}O_4$; olivines $LiMPO_4$ and their derivatives, in which M includes one or more of Mn, Fe, Co, or Ni, partially fluorinated compounds such as $LiVPO_4F$, other "polyanion" compounds, and vanadium oxides $V_xO_y$ including $V_2O_5$ and $V_6O_{11}$.

In some embodiments, the electrochemically active material for the positive electrode include those used in carbon monofluoride batteries, generally referred to as $CF_x$, or metal fluoride compounds having approximate stoichiometry $MF_2$ or $MF_3$ where M comprises Fe, Bi, Ni, Co, Ti, V. Examples include those described in H. Li, P. Balaya, and J. Maier, Li-Storage via Heterogeneous Reaction in Selected Binary Metal Fluorides and Oxides, Journal of The Electrochemical Society, 151 [11]A1878-A1885 (2004), M. Bervas, A. N. Mansour, W.-S. Woon, J. F. Al-Sharab, F. Badway, F. Cosandey, L. C. Klein, and G. G. Amatucci, "Investigation of the Lithiation and Delithiation Conversion Mechanisms in a Bismuth Fluoride Nanocomposites", J. Electrochem. Soc., 153, A799 (2006), and I. Plitz, F. Badway, J. Al-Sharab, A. DuPasquier, F. Cosandey and G. G. Amatucci, "Structure and Electrochemistry of Carbon-Metal Fluoride Nanocomposites Fabricated by a Solid State Redox Conversion Reaction", J. Electrochem. Soc., 152, A307 (2005).

In some embodiments, the electrochemically active material for the negative electrode includes graphite, graphitic boron-carbon alloys, hard or disordered carbon, lithium titanate spinel, or a solid metal or metal alloy or metalloid or metalloid alloy that reacts with lithium to form intermetallic compounds, including the metals Sn, Bi, Zn, Ag, and Al, and the metalloids Si and Ge.

In some embodiments, the electrochemically active material for the negative electrode includes graphitic or non-graphitic carbon, amorphous carbon, or mesocarbon microbeads; an unlithiated metal or metal alloy, such as metals including one or more of Ag, Al, Au, B, Ga, Ge, In, Sb, Sn, Si, or Zn, or a lithiated metal or metal alloy including such compounds as LiAl, $Li_9Al_4$, $Li_3Al$, LiZn, LiAg, $Li_{10}Ag_3$, $Li_5B_4$, $Li_7B_6$, $Li_{12}Si_7$, $Li_{21}Si_8$, $Li_{13}Si_4$, $Li_{21}Si_5$, $Li_5Sn_2$, $Li_{13}Sn_5$, $Li_7Sn_2$, $Li_{22}Sn_5$, $Li_3Sb$, $Li_3Sb$, LiBi, or $Li_3Bi$, or amorphous metal alloys of lithiated or non-lithiated compositions.

In some embodiments, the electrochemically active material for the negative electrode includes a semi-solid ion-storing redox composition including graphite, graphitic boron-carbon alloys, hard or disordered carbon, lithium titanate spinel, or a solid metal or metal alloy or metalloid or metalloid alloy that reacts with lithium to form intermetallic compounds, including the metals Sn, Bi, Zn, Ag, and Al, and the metalloids Si and Ge.

In some embodiments, the anolyte and/or catholyte semi-solids can function collectively as an ion-storage/ion-source, electron conductor, and ionic conductor in a single medium that acts as a working electrode. The conductivity of the anolyte and/or the catholyte semi-solids can be realized or improved by various conductive materials. In some embodiments, the resulting catholyte or anolyte mixture has an electronic conductivity of at least about $10^{-6}$ S/cm. In other embodiments, the mixture has an electronic conductivity between approximately $10^{-6}$ S/cm and $10^{-3}$ S/cm. In other embodiments, the mixture has an electronic conductivity of at least about $10^{-5}$ S/cm, or at least about $10^{-4}$ S/cm, of at least about $10^{-3}$ S/cm or more.

In some embodiments, the conductive material includes solid inorganic conductive materials such as metals, metal carbides, metal nitrides, metal oxides, and allotropes of carbon including carbon black, graphitic carbon, carbon fibers, carbon microfibers, vapor-grown carbon fibers (VGCF), activated carbon includes porous carbon, fullerenic carbons including "buckyballs," carbon nanotubes (CNTs), multiwall carbon nanotubes (MWNTs), single wall carbon nanotubes (SWNTs), graphene sheets or aggregates of graphene sheets, and materials comprising fullerenic fragments.

In some embodiments, the conductive material includes conductive polymers, including but not limited to polyaniline or polyacetylene based conductive polymers or poly(3, 4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocence-substituted polyethylene, carbazole-substituted polyethylene, polyoxyphenazine, polyacenes, or poly(heteroacenes).).

In some embodiments, the conductive material can be a coating over the anodic or cathodic particles. In certain specific embodiments, the conductive coating material has higher electron conductivity than the particles. In certain specific embodiments, the solid is graphite and the conductive coating material is a metal, metal carbide, metal oxide, metal nitride, or carbon. In certain specific embodiments, the metal is copper.

In some embodiments, the conductive material, either used in coating or suspension, is redox-inert at the operating conditions of the redox energy storage device. For example, the solid of the semi-solid ion-storing material can be coated with copper to increase the conductivity of the storage material particle, to increase the net conductivity of the semi-solid, and/or to facilitate charge transfer between energy storage particles and conductive additives. In another example, the storage material particle can be coated with, about 1.5% by weight, metallic copper. In yet another example, the storage material particle can be coated with, about 3.0% by weight, metallic copper. In yet another example, the storage material particle can be coated with, about 8.5% by weight, metallic copper. In yet another example, the storage material particle can be coated with, about 10.0% by weight, metallic copper. In yet another example, the storage material particle can be coated with, about 15.0% by weight, metallic copper. In yet another example, the storage material particle can be coated with, about 20.0% by weight, metallic copper.

In some embodiments, the conductive material includes a conductive matrix or a conductive network, produced by, for example, multicomponent-spray-drying a semi-solid of anode/cathode particles and conductive material particulates. In some embodiments, the conductive material includes one or more of: polyacetylene, polyaniline, polythiophene, polypyrrole, poly(p-phenylene), poly(triphenylene), polyazulene, polyfluorene, polynaphtalene, polyanthracene, polyfuran, polycarbazole, polyacenes, poly(heteroacenes). In some embodiments, the conductive material includes a compound that react in-situ to form a conductive polymer on the surface of active materials particles. In one embodiment, the compound includes 2-hexylthiophene or 3-hexylthiophene and oxidizes during charging of the battery to form a conductive polymer coating on solid particles in the cathode semi-solid suspension. In other embodiments, redox active material can be embedded in conductive matrix.

The redox active material can coat the exterior and interior interfaces in a flocculated or agglomerated particulate of conductive material. In other embodiments, the redox-active material and the conductive material can be two components of a composite particulate. Without being bound by any theory or mode of operation, such coatings can pacify the redox active particles and can help prevent undesirable reactions with carrier liquid or electrolyte. As such, it can serve as a synthetic solid-electrolyte interphase (SEI) layer.

In some embodiments, the conductive material includes inexpensive iron compounds such as pyrite ($FeS_2$), which can also be used as ion storage compounds. In one embodiment, the ion that is stored is $Li^+$.

In some embodiments, the conductive material comprises particles that can have various shapes. In some embodiments, the particle shape includes spheres, platelets, or rods to adjust solids packing fraction, increase the semi-solid's net electronic conductivity, and improve rheological behavior of the semi-solids. Low aspect ratio or substantially equiaxed particles tend to flow well, however, they tend to have a low packing density.

In some embodiments, the conductive material can have a plurality of sizes so as to increase packing fraction by placing smaller particles in the interstices of the larger particles. In particular, the particle size distribution can be bimodal, in which the average particle size of the larger particles is at least 5 times larger than the average particle size of the smaller particles. The mixture of large and small particles can improve flow of the material during cell loading and increases solid volume fraction and packing density in the loaded cell.

In some embodiments, the semi-solid electrode material 130 can further comprise a redox mediator which can improve charge transfer within the semi-solid suspension. A redox mediator is a hyperbranched polymer having redox moieties (e.g. ferrocene) incorporated into its structure and/or chemically bonded to its periphery. It is attached to an electrode and assists in transferring electrons between the electrode and a redox enzyme. In some embodiments, the redox mediator is based on $Fe^{2+}$ or $V^{2+}$, $V^{3+}$, or $V^{4+}$. In some embodiments, the redox mediator is ferrocene or a ferrocene-containing polymer. In some embodiments, the redox mediator is one or more of tetrathiafulvalene-substituted polystyrene, ferrocene-substituted polyethylene, carbazole-substituted polyethylene.

In some embodiments, the semi-solid electrode material 130 can further comprise various additives to improve the performance of the redox reaction. The liquid phase of the semi-solids in such instances would comprise a solvent, in which is dissolved an electrolyte salt, and binders, thickeners, or other additives added to improve stability, improve safety, reduce gas formation, improve SEI formation on the negative electrode particles, and the like. Examples of such additives include vinylene carbonate (VC), vinylethylene carbonate (VEC), fluoroethylene carbonate (FEC), or alkyl cinnamates, to provide a stable passivation layer on the anode or thin passivation layer on the oxide cathode; propane sultone (PS), propene sultone (PrS), or ethylene thiocarbonate as antigassing agents; biphenyl (BP), cyclohexylbenzene, or partially hydrogenated terphenyls, as gassing/safety/cathode polymerization agents; or lithium bis (oxatlato)borate as an anode passivation agent, and fluorinated phosphazene as non-flame or flame retardant additive.

In some embodiments, the semi-solid electrode material 130 can further comprise compounds to neutralize acids generated by the absorption of impurity water into the active materials. Exemplary compounds include but are not limited to silica gel, calcium sulfate (for example, the product known as Drierite), aluminum oxide, and aluminum hydroxide.

Porous Substrates

Figure 2B:
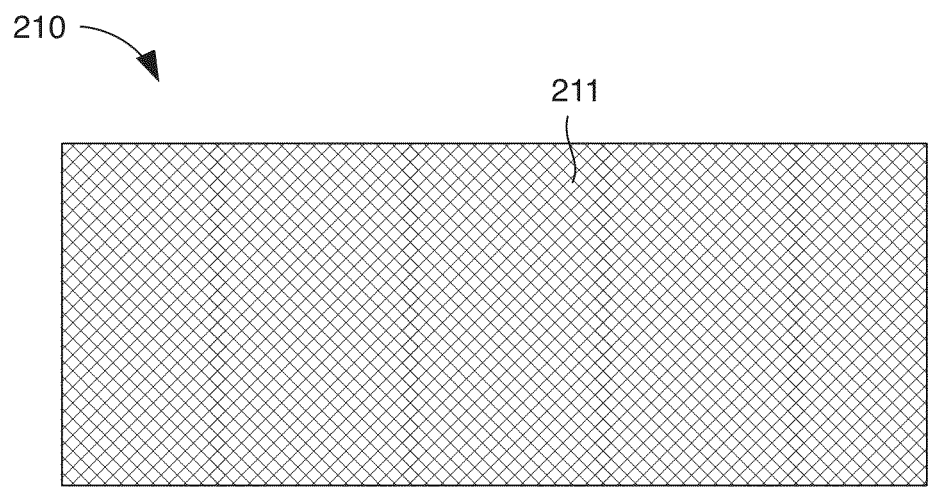
Figure 2C:
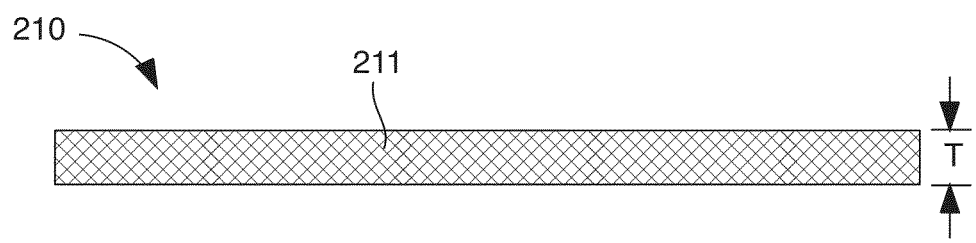

FIGS. 2A-2C are illustrations of a porous substrate 210 that can be included in the current collector 120 shown in FIG. 1. In some embodiments, as shown in FIG. 2A, the porous substrate 210 can include wire mesh (also referred to herein as mesh), which include a plurality of filament wires 211 defining a plurality of apertures 212 (also referred to as voids, open cells, or pores), as shown in FIG. 2B. The wires 211 can be assembled in various configurations using suitable processes, such as a regular pattern or structure produced by weaving, braiding, knitting, etc., or a more random pattern or structure produced by randomly distributing wires and joining them by welding, adhesives, or other suitable techniques.

In some embodiments, the wires 211 in the porous substrate 210 can include a metal material, such as steel, stainless steel, aluminum, nickel, lead, copper, titanium, silver, gold, tantalum, tin, zinc, tungsten, any combination thereof, or any other electrically conductive material. In some embodiments, the wires 211 can include a conductive non-metallic material such as carbon fiber, carbon nanotube, conductive plastics, or other conductive non-metallic materials. In some embodiments, the wires 211 can comprise a conductive skeleton covered with a conductive coating that has a high conductivity than that of the skeleton, therefore increasing the overall conductivity of the resulting mesh.

In some embodiments, the wires 211 in the porous substrate 210 can have a diameter of about 50 µm to about 5,000 µm. As readily understood in the art, given a wire material, larger diameter wires normally have higher electronic conductance. Therefore, diameter of the wire can be selected in combination with the material of the wire to achieve a desired electronic conductance (e.g., low electrical resistance).

In some embodiments, the wires 211 in the porous substrate 210 can be galvanized metal wire to prevent rusting. In some embodiments, the wires 211 of the mesh can be wire bundles or braided to increase the surface are of the resulting mesh. The spacing within a bundle or braid can be sufficiently large to allow the flow of the semi-solid electrode material.

In some embodiments, the wires 211 in the porous substrate 210 can be rigid to function as a support for the semi-solid electrode material. In some embodiments, the wires 211 can be flexible and can be combined with a rigid support to form an electrode. The rigid support can be, for example, a foil (metal or non-metal), a grid, or a frame. In some embodiments, the support can be formed of a metal alloy that is softened or hardened by heat or various metallurgical forming processes. In some embodiments, the support structure can include a three-dimensional (3-D) metal and/or carbon foam or mesh that is formed via one or more processes.

In some embodiments, the porous substrate 210 can include more than one type of wire 211 to improve the performance. For example, the porous substrate 210 can include wires 211 of different diameters, with the larger diameter wires to provide physical support and low resistance, and the smaller diameter wires to increase surface area of the resulting mesh. In another example, the porous substrate 210 can include wires 211 of different materials. For example, some wires can have higher mechanical strength to provide physical support, while other wires can have higher electronic conductivity to provide faster charge transfer. In addition, some wires can have higher thermal conductivity to dissipate heat, while others can have higher electronic conductivity. In yet another example, the porous substrate 210 can include wires 211 of different rigidity, with rigid wires to form a skeleton, and the flexible wires to increase surface area, electronic conductivity, or surface adhesion with the electrode materials.

In some embodiments, the porous substrate 210 can include a woven mesh with a selvage configured to prevent fraying. Similarly stated, the woven mesh can include an outer edge (i.e., selvage) configured to prevent the mesh weave from loosening, fraying, separating, and/or otherwise failing at the edges.

In some embodiments, the porous substrate 210 can be an electronically conductive (e.g., metallic) open-cell foam (e.g., a cellular structure consisting of solid metal containing relatively large volume fraction of gas-filled pores). The open cells (e.g., voids) form interconnected network that allows the semi-solid suspension to flow through the foam and substantially fill the voids such that the "gas-filled pores" become filled with the semi-solid suspension during the electrode manufacturing process. The porosity of the foam can be modified by changing the size (e.g., volume) of the gas-filled pores and/or density of the cellular structure. For example, the "struts" between the "vertices" of the cellular structure can be lengthened to create larger pores, thereby increasing the porosity of the foam. Alternatively, the "thickness" or "diameter" of the struts can be reduced to increase the size of the pores.

In some embodiments, the porous substrate 210 can be an expanded metal framework, a reticulated material, a non-metallic, conductive mesh, a perforated metal, an engineered micro-truss, conductive foam, or the like. In some embodiments, the porous substrate 210 can be any three-dimensional (3-D) conductive material that can serve as a current collector. The conductive material can include an expanded metal framework, a reticulated material, a non-metallic conductive material, a conductive mesh, a perforated metal, an engineered micro-truss, a conductive foam, and/or cellular structures comprising metal and/or carbon.

In some embodiments, the porous substrate 210 can have a rough surface so as to increase the surface area and/or increase the adhesion with the semi-solid electrode material. For example, the porous substrate can have a root mean squared (RMS) surface roughness of about 1 µm to about 10 µm, or greater than 10 µm. In another example, the RMS surface roughness of the porous substrate can be comparable to the particle size of the semi-solid electrode material.

In some embodiments, the porous substrate 210 can include one or more layers of coatings conformally deposited over the substrate surface. In some embodiments, the porous substrate 210 can include one or more layers of deposited coatings that substantially cover the substrate surface. For example, the coatings can be configured to reduce corrosion and enhance or reduce adhesion characteristics (e.g., hydrophilic or hydrophobic coatings, respectively). In another example, the coatings can comprise a material of high electronic conductivity to improve the overall charge transport of the porous substrate. In yet another example, the coatings can comprise a material of high thermal conductivity to facilitate heat dissipation of the porous substrate and protect the battery from overheating. In yet another example, the coatings can comprise a heat-resistant or fire-retardant material to prevent the battery from fire hazards. In yet another example, the coatings can be configured to be rough so as to increase the surface area and/or the adhesion with the semi-solid electrode material.

In some embodiments, the porous substrate 210 can include combinations of coatings. For example, the porous substrate 210 can include a rigid grid coated with materials of high thermal conductivity, and a flexible mesh of high electronic conductivity attached to the rigid grid to provide fast charge transport. In some embodiments, a portion of the porous substrate can be covered by one type of coating, and another portion of the porous substrate can be covered by another type of coating.

In some embodiments, the porous substrate 210 can have a range of porosity. Regardless of whether the porous substrate is a "foam," a "mesh", or any other porous structure defined herein, the porosity can be defined as the volume fraction of voids (e.g., gas-filled, liquid filled, or semi-solid filled) divided by the total volume of the porous substrate (e.g., sum of the volume fraction of the voids and the volume fraction of solid materials (e.g., cellular structure or wires). Therefore, the porosity can be modified to optimize the electronic conductivity, the resistance, structural performance, and/or any other electrical and physical characteristic. In some embodiments, the porous substrate 210 can have a porosity of at least 66%. In some embodiments, the porous substrate 210 can have a porosity of at least 80%. In some embodiments, the porous substrate 210 can have a porosity of at least 90%.

In some embodiments, the porous substrate 210 can include wire meshes and the porosity can be modified in any of a variety of ways including, for example, changing the thickness or diameter of the individual wires 211, changing the distance between adjacent wires 211, changing the angle at which individual wires intersect (e.g., braiding angle), or changing the number or wires in the pattern.

In some embodiments, the porous substrate 210 can have any suitable overall shape or size. For example, the porous substrate 210 can be substantially rectangular as shown in FIG. 2B. In other embodiments, the size and shape of the porous substrate 210 can substantially correspond to a shape and size of an electrochemical cell cavity (e.g., in an anode cell and/or a cathode cell, as further described herein). For example, in some embodiments, the substrate can be polygonal (e.g., square, pentagonal, hexagonal, etc.) or oval (e.g., circular, elliptical, oblong, etc.).

In some embodiments, the porous substrate 210 can also have any suitable thickness T as shown in FIG. 2C. In some embodiments, the thickness T can substantially correspond to a depth of an electrochemical cell cavity. In some embodiments, the thickness T can substantially correspond to one half of the depth of an electrochemical cell cavity. In other words, when two substrates 210 are stacked together to form a current collector (not shown), the current collector will have a thickness that substantially corresponds to the depth of an electrochemical cell cavity. In some embodiments, the substrate 210 can be sufficiently thick such that a desired electrical conductance is achieved. In some embodiments, the substrate 210 can be folded upon itself to increase the thickness T. In some embodiments, the substrate 210 can have a thickness T in a range of about 20 µm to about 400 µm. In some embodiments, the substrate 210 can have a thickness T in a range of about 50 µm to about 5,000 µm. In some embodiments, the substrate 210 can have a thickness T in a range of about 100 µm to about 3,000 µm. In some embodiments, the substrate 210 can have a thickness T in a range about 200 µm to about 2,500 µm. In some embodiments, a portion of the substrate can be folded and compressed to form an integral electrode lead.

In some embodiments, the size, thickness, aperture size, or any other parameter of the porous substrate 210 can be configured to produce optimal electrical performance. For example, increasing the diameter of the wires 211 can increase the thickness of the collector and allow for better electrical conductivity when placed in contact with an electrode material. In some embodiments, the openings 212 defined by the substrate 210 (either a wire mesh or other porous substrate) can be sufficiently large to not adversely affect the suspension of an electrode material (e.g., such that would produce a non-uniform suspension).

The porous substrate 210 can define apertures 212 of various shapes. For example, the apertures 212 can be round, oval, polygonal (e.g., square, rectangular, pentagonal, hexagonal, etc.), or irregular (random shape). The distribution of the apertures 212 can be substantially periodic, substantially random, or anything in between.

In some embodiments, the porous substrate 210 can define a pitch based at least in part on the distribution of the apertures 212. For example, the pitch of the porous substrate 210 can be the periodicity of the openings if the distribution is substantially periodic. In another example, when the distribution of the apertures 212 is substantially random, the pitch of the porous substrate can be defined in a statistical manner. For example, the pitch can be defined as the average distance between two adjacent apertures. Alternatively, the pitch can be defined as the median value of inter-aperture distances. Moreover, the pitch can also be defined as the weighted average of inter-aperture distances, in which extraordinary (too large or too small) values of inter-aperture distances carry a smaller weight.

In some embodiments, the pitch in the porous substrate 210 can vary in different regions of the substrate. For example, the porous substrates 210 can have a smaller pitch (more dense openings per length or lateral surface area) in a center region and larger pitch (fewer number of openings per length or lateral surface area) in an outer region.

Porous Current Collector

Referring now to FIGS. 3A-7, exemplary porous current collectors 320, 420, 520, 620, and 720 that can be used in electrodes according to the present disclosure. The porous current collectors 320, 420, 520, 620, and 720 can include two or more porous substrates as described herein. For example, the porous current collectors 320, 420, 520, 620, and 720 can include two or more porous substrates substantially similar to or the same as the porous substrates 210, as described above with reference to FIGS. 2A-2C. As such, unless explicitly described differently, aspects of the substrates included in the porous current collectors 320, 420, 520, 620, and 720 are not described in further detail herein.

FIGS. 3A-3B illustrate a porous current collector according to some embodiments, in which apertures of the two porous substrates are shifted with respect to each other by half a pitch. For illustration purposes only, FIG. 3A shows two porous substrates 310a and 310b that include wire meshes. The porous substrate 310a comprises a plurality of wires 311a defining a plurality of apertures 312a. The porous substrate 310a also includes an edge 315a, which can be, for example, a selvage, a wire, or even a virtual boundary, to function as a reference to gauge the pitch shift with respect to another porous substrate. Similarly, the porous substrate 310b comprises a plurality of wires 311b, a plurality of apertures 312b, and an edge 315b. The pitch shift can be seen by comparing relative positions of apertures 312a and 312b with respect to the edges 315a and 315b, respectively. In some embodiments, the pitch shift is half a pitch, as shown in FIG. 3A. In some embodiments, the pitch shift can be anywhere between 30% and 70% of the pitch of one porous substrate, either 310a or 310b, in the current collector. For example, the pitch shift can be 35% to 65%, 40% to 60%, or 45% to 55%. In some other embodiments, the pitch shift can be zero, i.e., the two porous substrates in the current collector are substantially identical.

FIG. 3B shows the current collector 320 resulting from stacking the two porous substrates 310a and 310b shown in FIG. 3A. The stacking of the two porous substrates 310a and 310b can effectively decrease the pitch of the resulting current collector 320 comparing to each individual porous substrate, while preserving the porosity in each porous substrate. Thus, stacking two or more porous substrates 310 together can alleviate the deviation and degradation of battery performance. For illustration purposes only, the two porous substrates 310a and 310b in FIGS. 3A-3B have different wire diameters. In practice, the two porous substrates can have either the same wire diameter or different wire diameters.

FIGS. 4A-4B illustrate a porous current collector according to some embodiments, in which the two porous substrates are substantially identical but are shifted with respect to each other when being stacked to form the current collector. In FIG. 4A, apertures 412a and 412b of the two porous substrates 410a and 410b, respectively, have substantially the same configuration, or the same phase with respect to the respective edges 415a and 415b. When forming the current collector 420 shown in FIG. 4B, one porous substrate is shifted by half a pitch with respect to the other. The resulting current collector 420 includes a non-overlapping region 422 and an overlapping region 424. The overlapping region 424 can have a pitch substantially equal to or smaller than that of the non-overlapping region 422 depending on the pitch shift. In some embodiments, wires 411a and 411b in the two porous substrates 410a and 410b are substantially identical (e.g., in FIG. 4A). In some other embodiments, the wires in the two porous substrates can be different so as to achieve desired performances (discussed in more detail below).

In some embodiments, a current collector can comprise two or more porous substrates that are dissimilar in one or more aspects. For example, as shown in FIGS. 5A-5B, a porous substrate 510a having diamond shape apertures 512a can be combined with another porous substrate 510b having rectangular apertures 512b. Moreover, diameters of the wires 511a and 511b in the two porous substrates 510a and 510b, respectively, can also be different. The resulting current collector 520, shown in FIG. 5B, can have aperiodic apertures. In another example, a porous substrate having a larger pitch can be combined with another porous substrate having a smaller pitch. Similarly, a porous substrate having a larger opening size can be combined with a porous substrate having a smaller opening size. In some embodiments, a porous substrate having a high electronic conductivity can be stack together with a porous substrate having a high thermal conductivity. In some embodiments, a porous substrate with heat-resistant coating can be stacked with a porous substrate with a high conductivity coating. In some embodiments, a porous substrate that is substantially rigid can be combined with a porous substrate that is substantially flexible.

Figure 6:
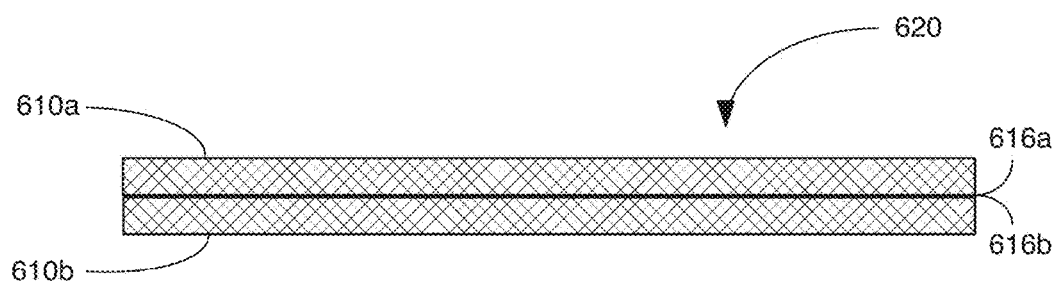
FIG. 6 is a schematic illustration of porous substrates stacked together to form a current collector, according to an embodiment.

In some embodiments, a current collector can comprise two porous substrates that are in physical contact with each other, as shown in the cross-sectional illustration of current collector 620 in FIG. 6. In this case, two porous substrates 610a and 610b are stacked over each other to form the current collector 620. For illustration purposes only, the inner edges of the two porous substrates 616a and 616b are emphasized in black lines to show that the current collector 620 comprises two separate porous substrates 610a and 610b.

Figure 7A:
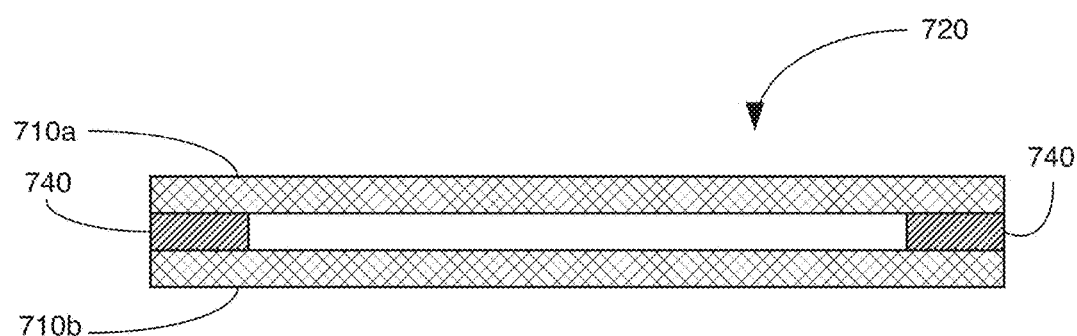
FIGS. 7A-7B are schematic illustrations of porous substrates stacked together to form a current collector, according to various embodiments.

In some embodiments, a current collector can comprise two porous substrates that are separated by a distance, which can be, for example, about 50 µm to about 5,000 µm. In some embodiments, the two porous substrates are separated by a conductive spacer 740 so as to provide a high electronic conduction between two porous substrates 710a and 710b, as shown in FIG. 7A. In this case, the two porous substrates 710a and 710b in the current collector 720 are separated by the spacer 740 on both ends of the current collector 720. In some embodiments, the spacer 740 can be disposed on only one end of the current collector 720. In some embodiments, additional spacer 740 can be disposed anywhere between the two ends of the current collector 720 so as to provide, for example, mechanical support or better electrical conduction.

In some embodiments, the spacer 740 can include metal wires that are substantially perpendicular to the plane of the two porous substrates. The metal wires in the spacer 740 can be configured to electrically connect the two substrates. Moreover, metal wires can have a large surface area to volume ratio, thereby increasing the potential capacity of the resulting electrochemical cells.

In some embodiments, the spacer 740 can be the electrode materials embedded into the current collector. The separation between the two porous substrates can be determined, for example, by the desired internal conductivity of the battery, which can be related to the mean distance between a charge carrier in the electrode material to the current collector.

In some embodiments, a current collector can comprise more than two porous substrates. The number of porous substrates can depend on the desired property (e.g., thickness, conductivity, or mechanical strength) of the resulting electrode. In some embodiments, the number of porous substrates in a current collector can be 3, 4, 5 or even more.

Figure 7B:
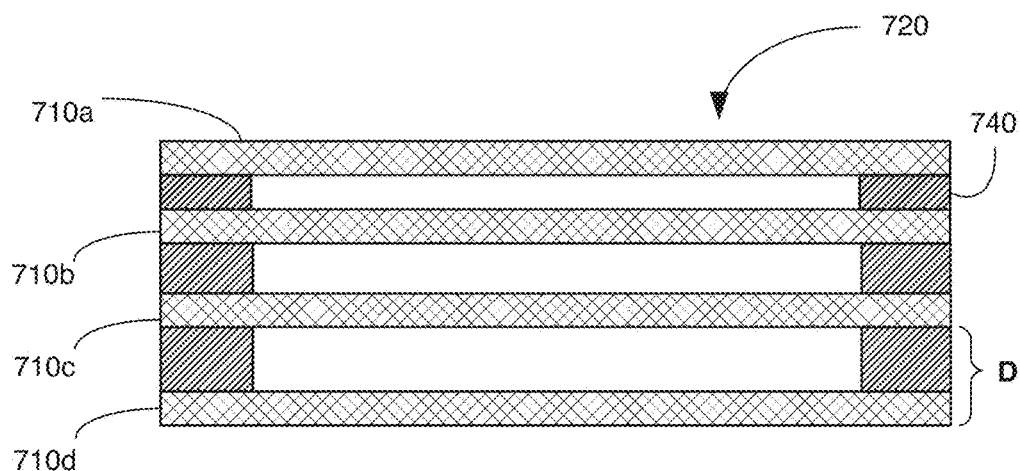

In some embodiments, as shown in FIG. 7B, the current collector 720 includes multiple porous substrates 710a, 710b, 710c, and 710d (collectively referred to as porous substrates 710) that are substantially similar, and the apertures of the porous substrates 710 are substantially aligned such that there is no discernable pitch shift among the porous substrates 710. In some embodiments, the multiple porous substrates 710 in the current collector 720 are substantially similar, but at least one porous substrate is shifted with respect to another porous substrate. In some embodiments, each porous substrate is shifted with respect to the adjacent porous substrate.

In some embodiment, the current collector 720 can have a monotonic pitch shift among the porous substrates 710. For example, the second porous substrate 710b is a quarter pitch to the left of the first porous substrate 710a, the third porous substrate 710c is a quarter pitch to the left of the second porous substrate 710b, and so on. In some embodiments, the pitch shift is alternating. For example, the second porous substrate 710b is a quarter pitch to the left of the first porous substrate 710a, the third porous substrate 710c is a quarter pitch to the right of the second porous substrate 710b, and so on. In some embodiments, the pitch shift between adjacent porous substrates is constant. In some embodiments, the pitch shift between adjacent porous substrates is changing. For example, porous substrates 710b and 710c in the center of the current collector can have a smaller pitch shift so as to provide a relatively short distance between the charge carrier and the current collector 720, and a larger pitch shift on the edge of the current collector 720. Alternatively, the porous substrates 710 can have a smaller pitch near one edge of the current collector 720 and a larger pitch shift near the other edge so as to form a gradient in pitch shift through the depth of the current collector 720.

In some embodiments, the total pitch shift, which can be defined as the largest pitch shift between any two adjacent porous substrates in the current collector 720, can be 30% to 70% of the pitch of one of the substrates. For example, the total pitch shift can be half pitch, quarter pitch, or any other suitable value.

In some embodiments, the multiple porous substrates 710 in the current collector 720 are directly stacked together with adjacent porous substrates in contact with each other. In some embodiments, the multiple porous substrates 710 in the current collector 720 are separated from each other by spacers, which can be, for example, a conductive sheet, one or more conductive wires, or the semi-solid electrode material. In some embodiments, part of the porous substrates 710 can be stacked into a group with adjacent substrates in the group having contact with each other. Different groups of porous substrates can then be separated from other groups by spacers.

In some embodiments, the distance D (also referred to as inter-substrate distance) between adjacent porous substrates can be a constant, in which case any two adjacent substrates are separated by the same distance.

In some embodiments, the current collector 720 can include a variable inter-substrate distance D in the multiple porous substrates 710, in which case two pairs of adjacent substrates can have two different separation distances. The multiple inter-substrate distances D can form a sequence, such as an arithmetic sequence, a geometric sequence, a Fibonacci sequence, or any other sequence known in the art. In some embodiments, the beginning point of the sequence is on the edge (beginning or end) of the current collector 720. In some embodiments, the beginning point of the sequence is at the center of the current collector 720. For example, the porous substrates 710 closer to the center of the current collector 720 can have a smaller inter-substrate distance D so as to provide a short distance for charge carriers to reach the current collector 720, and a larger inter-substrate distance D so as to hold a larger total volume of electrode material and provide a higher capacity of the battery. The total distance between the two porous substrates 710 on the two edges of the current collector 720 can be, for example, about 50 µm to about 5,000 µm.

In some embodiments, the current collector 720 can include multiple porous substrates 710 having different substrate parameters so as to improve the performance of the current collector. The substrate parameters can include pitch, porosity, material, coating, and wire diameter (in the case of wire mesh current collector), among others.

In some embodiments, the current collector can 720 include multiple porous substrates 710 having a plurality of substrate pitches that form a sequence, such as an arithmetic sequence, a geometric sequence, or any other sequence known in the art. In some embodiments, pitches of the multiple porous substrates 710 are arbitrary, with a maximum pitch and a minimum pitch, determined at least in part by the desired overall conductivity of the current collector 720. In some embodiments, the porous substrates 710 having smaller pitches can be disposed at locations where electrochemical reaction is more frequent (e.g., at or near one edge of the electrode).

In some embodiments, the current collector 720 can include multiple porous substrates 710 having a plurality of substrate porosities so as to optimize the average distance a charge carrier travels before reaching the current collector 720. In some embodiments, the porous substrates 710 having smaller porosity can be disposed at locations where electrochemical reaction is more frequent. In some embodiments, the porous substrates 710 having smaller porosity can be disposed at the edge of the current collector 720 so as to hold more stably the semi-solid electrode materials.

In some embodiments, the current collector 720 can include multiple porous substrates 710 having a plurality of substrate materials. For example, some porous substrates 710 can be made from corrosion resistant materials and some porous substrates 710 can be made from highly conductive materials, such that the resulting current collector 720 can have both high conductivity and reliability. In another example, some porous substrates 710 can comprise rigid materials to provide support for other porous substrates that are flexible but can have larger surface areas.

In some embodiments, the current collector 720 can include multiple porous substrates 710 having a plurality of substrate coatings. For example, some porous substrates 710 can be coated with heat-resistant materials, while others are coated with highly conductive materials. In another example, some porous substrates 710 can be coated with corrosion resistant materials, while others are coated with adhesive materials to facilitate attachment of the semi-solid electrode materials to the current collector 720, preventing delamination. For example, porous substrates 710 on the edge of the current collector 720 can be coated with the adhesive material to help hold the electrode materials.

In some embodiments, the current collector 720 can include multiple porous substrates 710 having a plurality of wire diameters when the porous substrates 710 are wire meshes. Wire diameter can be related to several parameters of the resulting current collector, including surface area to volume ratio, conductivity, thickness, rigidity, and porosity, among others. Including different wire diameters in the current collector 720 can thus enable tuning the performance of the current collector 720. For example, wire meshes with larger diameter wires can be disposed at locations where electrochemical reaction is more frequent so as to help charge transfer.

In some embodiments, the current collector 720 can include multiple porous substrates 710 that can be divided into groups, each group having a characteristic parameter, such as pitch, conductivity, coating, material, and porosity, among others. For example, the porous substrates 710 having the same pitch can be grouped together first, then the groups of substrates having different pitches can be stacked together to form the current collector.

Semi-Solid Electrodes

The semi-solid electrode material 130 and the current collector 120 shown in FIG. 1 can be coupled or embedded together in several different configurations. Exemplary and non-limiting configurations are shown in FIGS. 8A-8E.

Figure 8A:
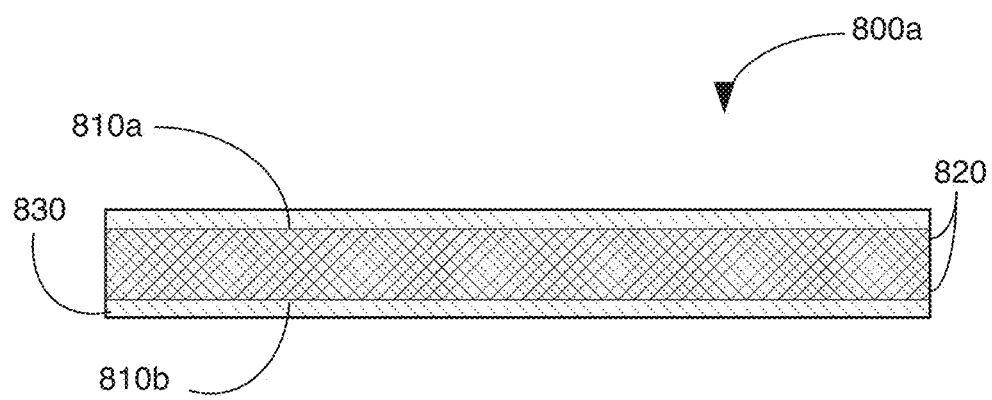
FIGS. 8A-8E are schematic illustrations of semi-solid electrodes including porous current collectors, according to various embodiments.

FIG. 8A shows an electrode 800a, in which porous substrates 810a and 810b are stacked together with physical contact to form a current collector 820, according to one embodiment. Electrode material 830 is disposed both within and outside the current collector 820 so as to substantially encapsulate the current collector 820 to form the electrode 800a. In some embodiments, the electrode material 830 can be substantially as thick as the current collector 820 such that the electrode material 830 is within the pores of the porous substrates 810a and 810b. In some embodiments, the electrode material 830 can be substantially thinner than the current collector 820.

Figure 8B:
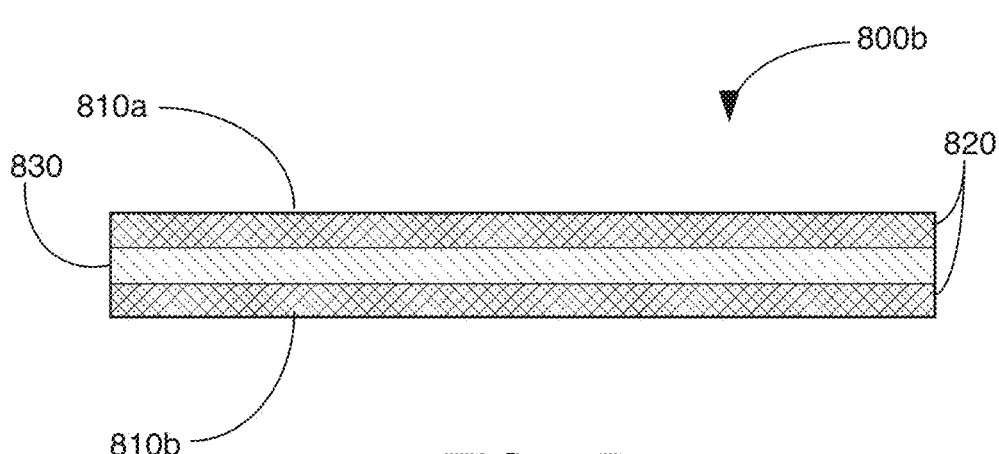

FIG. 8B shows an electrode 800b, in which porous substrates 810a and 810b are separated. The electrode material 830 is disposed substantially within the space defined by the two porous substrates 810a and 810b, including the space within the porous substrates 810a and 810b. The electrode material 830, in operation, can also function as a spacer to maintain the separation between the two porous substrates 810a and 810b.

Figure 8C:
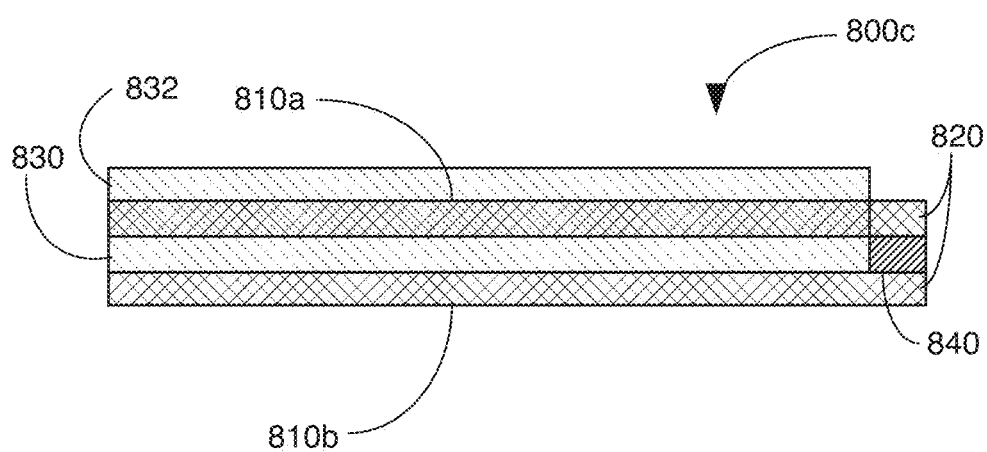

In some embodiments, the semi-solid electrode material 830 can be disposed substantially over the porous substrate 810b while substantially encapsulating the porous substrate 810a in the current collector 820 to form an electrode 800c, as shown in FIG. 8C. In some embodiments, the porous substrate 810b can have a small porosity so as to function as a wall and hold the semi-solid electrode material 830. In some embodiments, the semi-solid electrode material 830 has a portion 832 that is substantially outside the space defined by the porous substrates 810a and 810b. In some embodiment, the outside portion 832 can have a thickness substantially equal to the separation distance between the porous substrates 810*a* and 810*b*, in which case the semi-solid electrode material 830 is disposed substantially symmetric with respect to the porous substrate 810*a*. In some embodiments, a spacer 840 can be used to maintain the separation of the two porous substrates 810*a* and 810*b*. In some embodiments, the semi-solid electrode material 830 does not encapsulate the region including the spacer 840 so as to facilitate the coupling of the electrode 800*c* with an external circuit. In some embodiments, the semi-solid electrode material 830 can also encapsulate the region including the spacer 840 so as to increase the capacity of the electrochemical cell.

Figure 8D:
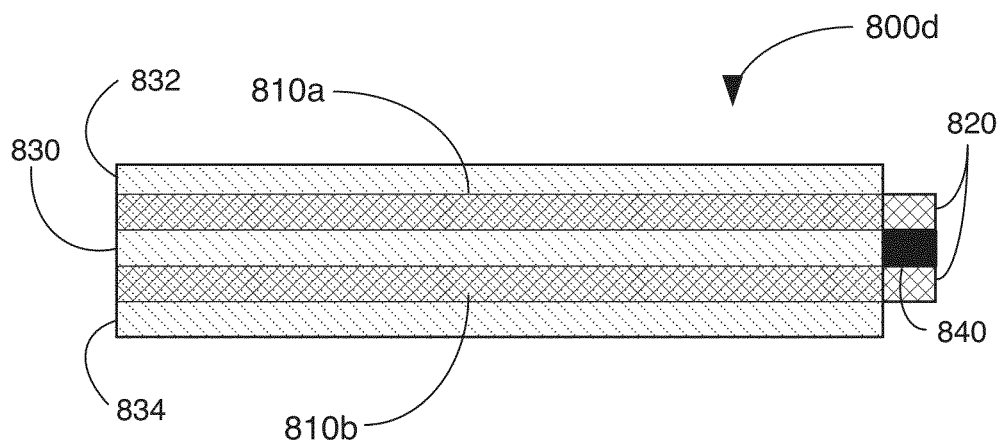
Figure 8E:
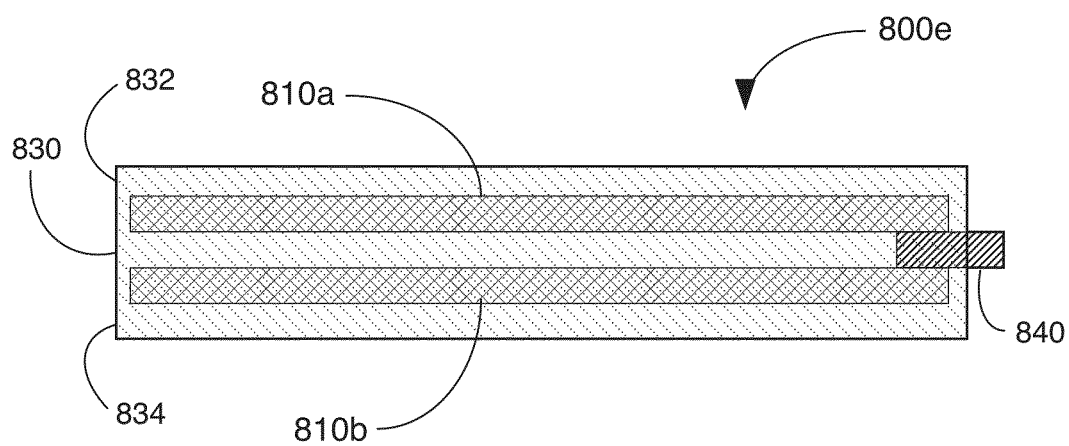

In some embodiments, the semi-solid electrode material 830 can have two outside portions 832 and 834 that are outside the space defined by the porous substrates 810*a* and 810*b* of an electrode 800*d*, as shown in FIG. 8D. In some embodiments, the electrode configurations, as shown in FIGS. 8D and 8E can be used in a bipolar cell. In some embodiments, only one side of the electrode 800*d* may face the ionic flow that can have electrochemical reactions with the semi-solid electrode material 830. Accordingly, the side facing the ionic flow can have a higher electrochemical reaction rate and a higher concentration of charge carriers. In some embodiments, the side facing the ionic flow can have a thicker outside portion 832 or 834 compared to the opposite side of the ionic flow, such that more charge carriers can be created and transferred out of the electrode 800*d* via the current collector 820. In some embodiments, the side facing the ionic flow can have a thinner outside portion 832 or 834 comparing to the side opposite the ionic flow. In this case, the side facing the ionic flow has a higher concentration of charge carriers but smaller volume, and the side opposite the ionic flow has a lower concentration of charge carriers but larger volume. The overall effect can be a balance of charge carrier transfer rate on the two porous substrates 810*a* and 810*b*, accordingly balancing the heat generation and/or thermal conduction in the current collector and potentially extending the lifetime of the electrode.

In some embodiments, the thickness of the semi-solid electrode material 830 can be determined by the conductivity of the electrode material and current collectors. Without being bound by any theory or mode of operation, conductivity (or impedance) of an electrode can be related to a mean distance for a charge carrier (i.e., electron) created from an electrochemical reaction to reach the current collector. Typically, a shorter mean distance results in a higher conductance, i.e., easier for the charge carriers (electrons) to reach the current collector. In some embodiments, the thickness of the semi-solid electrode material 830 can be determined by the desired capacity of the electrochemical cell(s).

In some embodiments, the semi-solid electrode material 830 can substantially encapsulate the space defined by porous substrates 810*a* and 810*b*, as shown in FIG. 8E, in which the spacer 840 can be extended out of the semi-solid electrode material 830 to couple an electrode 800*e* to an external circuit. In some embodiments, an additional tab (not shown) can be used to couple the electrode 800*e* to an external circuit.

In some embodiments, the semi-solid electrode material 830 can flow into the pores of the porous substrates 810 at a substantially ambient temperature. In other embodiments, the semi-solid electrode material 830 can be heated to facilitate the flowing of the semi-solid electrode material 830 into the pores of the porous substrates 810.

In some embodiments, the current collector 820 can have a thickness T (as described earlier with reference to FIG. 1), which can be defined as the total thickness of the porous substrates 810 plus the inter-substrate distances, in a range of about 50 µm to about 5,000 µm, in a range of about 100 µm to about 3,000 µm or in a range about 200 µm to about 2,500 µm. In some embodiments, any one of the finished electrodes 800*a*, 800*b*, 800*c*, 800*d*, and 800*e* (collectively referred to as finished electrodes 800) can have a thickness that is substantially equal to the thickness T of the current collector 820. In some embodiments, the finished electrodes 800 can have a thickness that is greater than the thickness T of the current collector 820. For example, as shown in FIGS. 8D and 8E, the semi-solid electrode material 830 extends beyond the thickness of the current collector 820 so that the thickness of the finished electrodes 800 is greater than the current collector 820. In some embodiments, the thickness of the current collector 820 is greater than about 20%, about 25%, about 30%, about 35%, about 40%, about 50%, about 55%, about 60%, about 65%, about 70%, about 75%, about 80%, about 85%, about 90%, or about 95% of the thickness of the finished electrodes 800. In some embodiments, the thickness of the current collector 820 is substantially equal to the thickness of the finished electrodes 800. Said another way, when the thickness of a finished electrode 800 is substantially equal to or greater than the thickness of the current collector 820, the finished electrode 800 can be considered a "double-side" electrode.

In some embodiments, the finished electrode 800 can be a multi-layer electrode, for example, a triple-layer electrode, a quadruple-layer electrode, or any other electrode with more than four layers. In some embodiments, the loading and/or thickness of each of the layers in the multi-layer electrode can be substantially the same.

In some embodiments, a triple-layer electrode can have a first layer with a first loading, a second layer with a second loading, and a third layer with a third loading. The first loading, second loading, and the third loading can be the same or different. For example, the second loading can be greater than the first loading. In other words, the first loading can be a relatively low loading when compared to the second loading, and the second loading can be a relatively high loading when compared to the first loading. The third loading can be equal to the first loading or the second loading, and can be different altogether (e.g., relatively higher than the second loading, relatively lower than the first loading, greater than the first loading and less than the second loading, and so on).

In some embodiments, the loading in the first layer (i.e., the first loading) can include about 20% to about 75% by volume of an active material. In some embodiments, the first loading can include about 35% to about 75% by volume, about 40% to about 75% by volume, about 45% to about 75% by volume, about 50% to about 75% by volume, about 55% to about 75% by volume, about 60% to about 75% by volume, or about 65% to about 75% by volume of an active material, inclusive of all ranges therebetween.

In some embodiments, the loading in the second layer (i.e., the second loading) can include about 20% to about 75% by volume of an active material. In some embodiments, the second loading can include about 35% to about 75% by volume, about 40% to about 75% by volume, about 45% to about 75% by volume, about 50% to about 75% by volume, about 55% to about 75% by volume, about 60% to about 75% by volume, or about 65% to about 75% by volume of an active material, inclusive of all ranges therebetween.

In some embodiments, the loading in the third layer (i.e., the third loading) can include about 20% to about 75% by volume of an active material. In some embodiments, the third loading can include about 35% to about 75% by volume, about 40% to about 75% by volume, about 45% to about 75% by volume, about 50% to about 75% by volume, about 55% to about 75% by volume, about 60% to about 75% by volume, or about 65% to about 75% by volume of an active material, inclusive of all ranges therebetween.

In some embodiments, at least one of the first, second, and third layers can have a relatively high-loading when compared to at least one of the other layers. For example, in some embodiments, a relatively high-loading layer can have about 0% to about 55% by volume of more active material than another layer with relatively low-loading. In some embodiments, the relatively high-loading layer can have about 0% to about 3% by volume, about 2% to about 5% by volume, about 2% to about 7% by volume, about 2% to about 10% by volume, about 2% to about 20% by volume, about 2% to about 40% by volume, about 5% to about 50% by volume, about 5% to about 55% by volume, about 10% to about 30% by volume, about 10% to about 40% by volume, about 10% to about 55% by volume, about 15% to about 30% by volume, about 15% to about 50% by volume, about 15% to about 55% by volume, about 20% to about 30% by volume, about 20% to about 40% by volume, about 20% to about 55% by volume, about 25% to about 40% by volume, about 25% to about 50% by volume, about 25% to about 55% by volume, about 35% to about 40% by volume, about 35% to about 45% by volume, about 35% to about 55% by volume, about 40% to about 50% by volume, about 45% to about 50% by volume, about 45% to about 55% by volume, of more active material than a layer with low-loading.

In some embodiments, a relatively low-loading layer can include about 20% to about 50% by volume of an active material. In some embodiments, the relatively low-loading layer can include about 20% to about 25% by volume, about 25% to about 40% by volume, about 20% to about 35% by volume, about 25% to about 40% by volume, about 30% to about 45% by volume, or about 25% to about 50% by volume of an active material, inclusive of all ranges therebetween.

In some embodiments, the relatively high-loading layer can include about 50% to about 75% by volume of an active material. In some embodiments, the relatively high-loading layer can include about 50% to about 55% by volume, about 55% to about 70% by volume, about 50% to about 65% by volume, about 55% to about 70% by volume, about 60% to about 75% by volume, or about 55% to about 75% by volume of an active material, inclusive of all ranges therebetween.

In some embodiments, a multi-layer electrode can be configured to dispose a layer with low-loading to face the separator. In some embodiments, a multi-layer electrode can be configured to dispose a layer with high-loading to face the separator.

Likewise, in some embodiments, a triple-layer electrode can have a first layer with a first thickness, a second layer with a second thickness, and a third layer with a third thickness. The first thickness, second thickness, and the third thickness can be the same or different. For example, the second thickness can be greater than the first thickness, and the third thickness can be equal to the second thickness. In some embodiments, the second thickness can be greater than the first thickness, and the third thickness can be greater than the second thickness, or any combinations thereof. In some embodiments, the first thickness, the second thickness, and/or the third thickness can be in a range of about 20 μm to about 400 μm. In some embodiments, the first thickness, the second thickness, and/or the third thickness can be in a range of about 30 μm to about 400 μm, about 40 μm to about 400 μm, about 50 μm to about 400 μm, about 60 μm to about 400 μm, about 70 μm to about 400 μm, about 80 μm to about 400 μm, about 90 μm to about 400 μm, about 100 μm to about 400 μm, about 125 μm to about 400 μm, about 150 μm to about 400 μm, about 175 μm to about 400 μm, about 200 μm to about 400 μm, about 225 μm to about 400 μm, about 250 μm to about 400 μm, about 275 μm to about 400 μm, about 300 μm to about 400 μm, about 325 μm to about 400 μm, about 350 μm to about 400 μm, or about 375 μm to about 400 μm, inclusive of all ranges therebetween.

In some embodiments, all the layers in a multi-layer electrode can have substantially similar pore sizes. In some embodiments, each or one or more of the layers in the multi-layer electrode can have substantially different pore sizes. For example, a triple-layer electrode can have a first layer with a first pore size, a second layer with a second pore size, and a third layer with a third pore size. The first pore size, second pore size, and the third pore size can be the same or different. In some embodiments, the second pore size can be greater than the first pore size, and the third pore size can be equal to the second pore size. In some embodiments, the second pore size can be greater than the first pore size, and the third pore size can be greater than the second pore size, or any combinations thereof.

In some embodiments, for example, a multi-layer electrode can have varying pitch shifts between the adjacent layers in the multi-layer electrode. In some embodiments, the pitch shifts between any two adjacent layers in the multi-layer electrode can be substantially the same. In some embodiments, the pitch shifts between any two adjacent layers in the multi-layer electrode can be substantially different. For example, a triple-layer electrode can have a first layer pitch shifted from a second layer by 35%, and the second layer pitch shifted from a third layer by 50%.

Electrochemical Cells

FIGS. 9A-9C show exemplary electrochemical cells including the semi-solid electrodes described above. FIG. 9A shows an electrochemical cell including an anode current collector 920 that comprises two porous substrates 910a and 910b (collectively referred to as porous substrates 910), an anode material 930, a separator 940, a cathode current collector 950, and a cathode material 960. The anode material 930 is in electrical communication with the anode current collector 920 to form an anode, and the cathode material 960 is in electrical communication with the cathode current collector 950 to form a cathode. The separator 940 is disposed between the anode and the cathode to prevent short circuit between the anode and the cathode, but at the same time allowing ionic flow or ion exchange between the anode and the cathode so as to maintain the electrochemical reaction. Although only two porous substrates is shown in FIG. 9A, any number of porous substrates 910 can be used as described above. In some embodiments, the cathode current collector 950 can include a plurality of porous substrates 970a and 970b (collectively referred to as porous substrates 970), as shown in FIG. 9B. In some embodiments, both the anode current collector 920 and the cathode current collector 950 can include a plurality of porous substrates 910 and 970, respectively, as shown in FIG. 9C.

Processes of Manufacturing the Electrodes and Electrochemical Cells

Figure 10A:
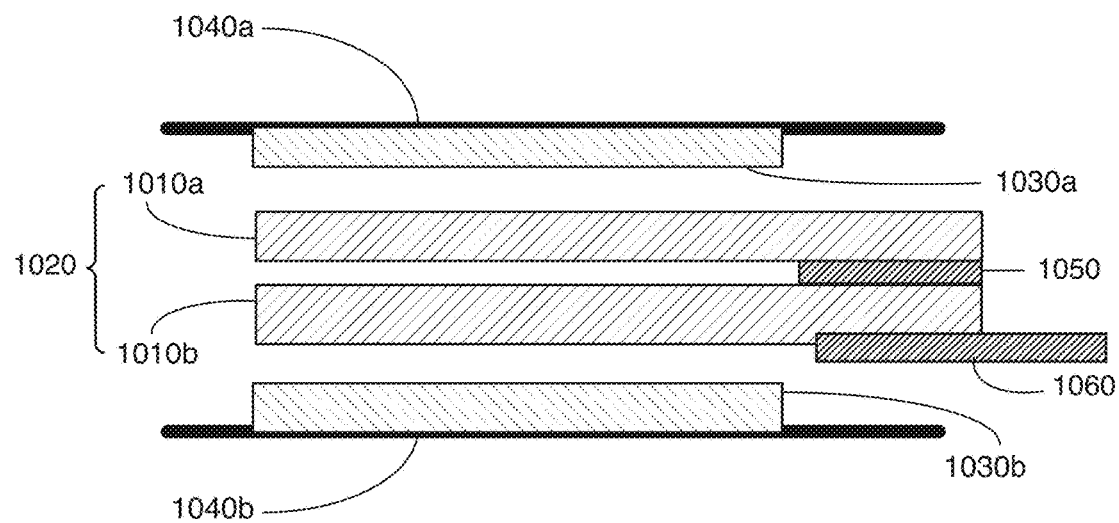
FIGS. 10A-10B illustrate a system for depositing semi-solid electrode materials on, or at least partially within, a porous current collector, according to an embodiment.
Figure 10B:
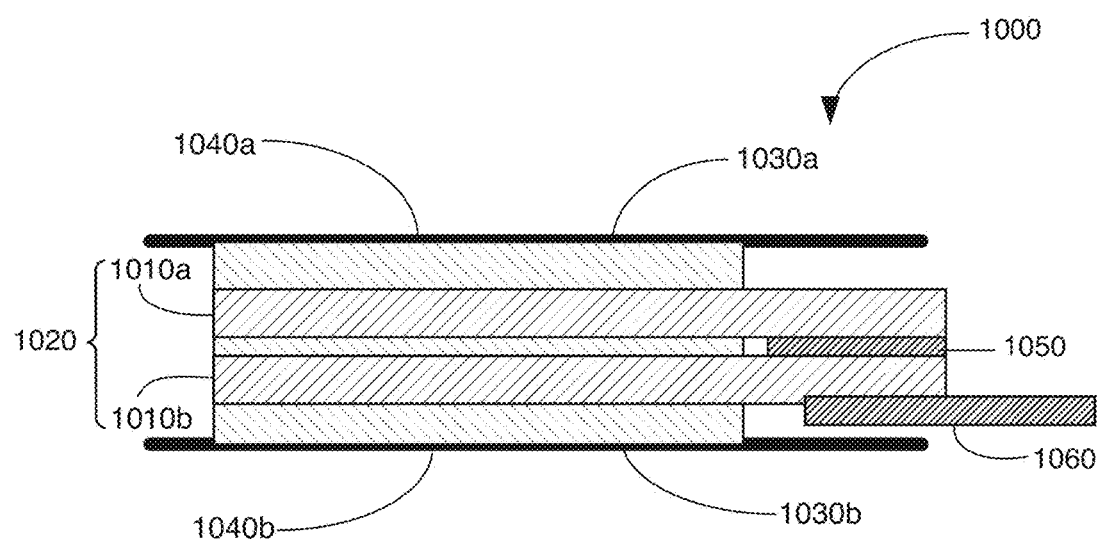

FIGS. 10A-10B show a process of preparing an electrode that comprises a semi-solid electrode material and a porous current collector substantially like those described above. The porous current collector in this example includes two mesh wires, but this method can be extended to current collectors comprising any number of wire meshes or other porous substrates. In this process, two porous substrates 1010a and 1010b (collectively referred to as porous substrates 1010) are coupled together by a spacer 1050, which can be a conductive piece (e.g., a metal sheet) disposed via soldering, welding, or other bonding methods, to form a current collector 1020. A conductive tab 1060 is attached to the porous substrates 1010 as a lead to couple the electrode to external circuits. Semi-solid electrode materials 1030a and 1030b (collectively referred to as semi-solid electrode material 1030) are disposed onto one surface of each of walls 1040a and 1040b (collectively referred to as walls 1040), respectively. The walls 1040 with their inner surfaces having the semi-solid electrode materials 1030 are placed so as to face and "sandwich" either side of the porous substrates 1010, as shown in FIG. 10A.

FIG. 10B shows the resulting electrode 1000 after pressing the two walls 1040 shown in FIG. 10A against each other. The pressing can cause the semi-solid materials 1030a and 1030b to flow into the pores or apertures of the porous substrates 1010 until the space, defined by the two walls 1040, is filled with the semi-solid electrode materials 1030. In some embodiments, the amount of semi-solid electrode materials 1030a and 1030b on each wall can be configured such that after compressing, the electrode 1000 is substantially thicker than the current collector 1020. In some embodiments, the amount of semi-solid electrode materials 1030a and 1030b on each wall can be configured such that after compressing, the thickness of the electrode 1000 is substantially the same as that of the current collector 1020 prior to introduction of the semi-solid electrode materials 1030.

In some embodiments, one of the semi-solid electrode materials 1030a or 1030b can be disposed onto one of the two walls 1040a or 1040b. In some embodiments, the semi-solid electrode materials 1030 can be disposed over the porous substrates 1010, and the two walls 1040 are placed onto the semi-solid electrode materials 1030 and pressed so as to drive the semi-solid electrode materials 1030 into the current collector 1020. In some embodiments, one of the walls 1040 is fixed, while the other wall is driven to move toward the fixed wall to complete the pressing operation.

In some embodiments, the walls 1040 can be removed from the resulting electrode 1000 after pressing. In some embodiments, the walls 1040 can be the separators used in electrochemical cells and can stay with the resulting electrode 1000 for further fabrication of electrochemical cells.

In some embodiments, an ultrasonic wave can be employed to facilitate flowing of the semi-solid electrode material 1030 into the pores or apertures of the porous substrates 1010. In some embodiments, a heater can be employed to heat up the semi-solid electrode materials 1030 and facilitate the flowing.

Figure 11:
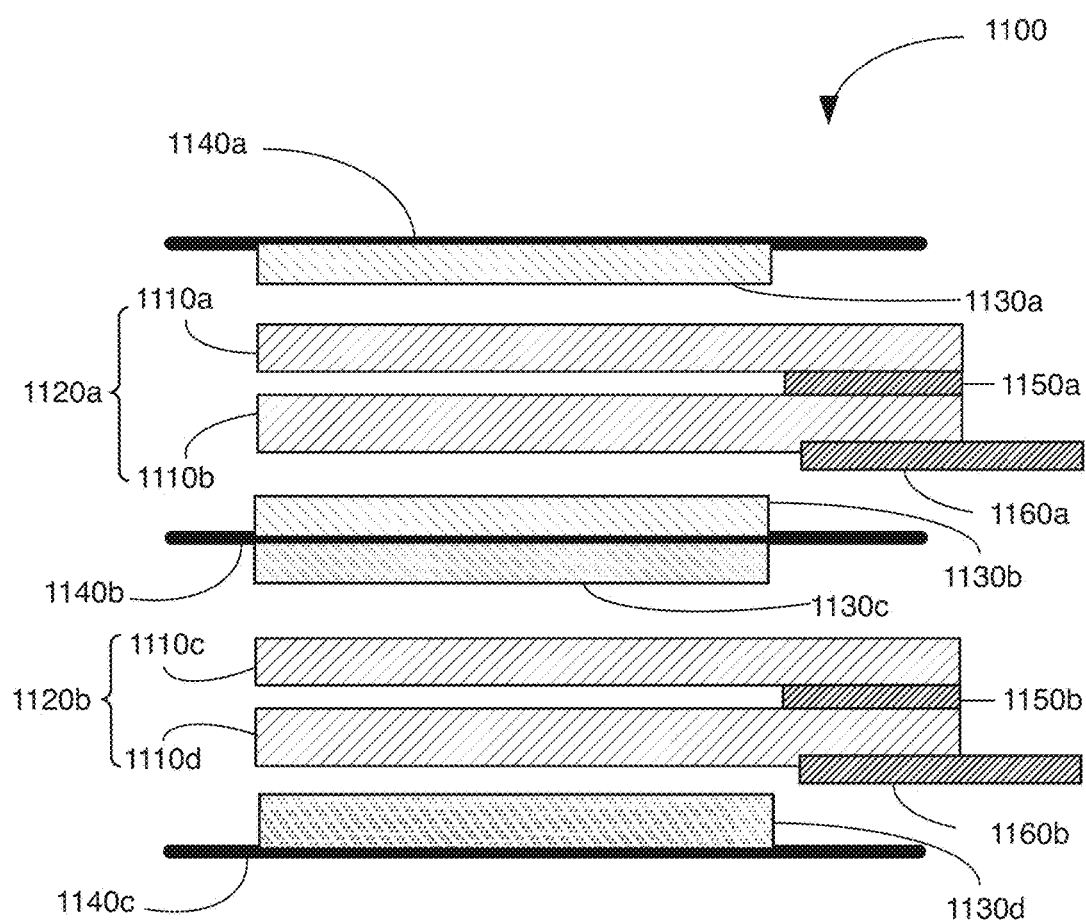
FIG. 11 illustrates a system for making an electrochemical cell including one or more porous current collectors, according to an embodiment.

The process shown in FIG. 10A-10B for electrode manufacturing can be extended to manufacture electrochemical cells as shown in FIG. 11. In this process, two doses of anode materials 1130a and 1130b (collectively referred to as anode materials 1130) are attached to walls 1140a and 1140b. Two anode porous substrates 1110a and 1110b form an anode current collector 1120a, which is disposed between the two walls 1140a and 1140b. The two anode porous substrates 1110a and 1110b are separated by a spacer 1150a, with a conductive tab 1160a attached to one of the anode porous substrates as a lead to couple the anode porous substrates to external circuits. Similarly, two doses of cathode materials 1130c and 1130d are attached to two walls 1140b and 1140c. Two cathode porous substrates 1110c and 1110d form a cathode current collector 1120b, which is disposed between the two walls 1140b and 1140c. The two cathode porous substrates 1110c and 1110d are separated by a spacer 1150b, with a conductive tab 1160b attached to one of the cathode porous substrates as a lead to couple the cathode porous substrates to external circuits.

The middle wall 1140b can include a separator used in electrochemical cells. In this case, pressing the walls 1140a and 1140c against each other can cause the respective electrode material (anode and cathode material) to flow through the pores or apertures of respective porous substrates (anode and cathode porous substrates) and result in an electrochemical cell 1100 including an anode, a cathode, and a separator disposed in between.

In some embodiments, the side walls 1140a and 1140c can also include separators used in electrochemical cells such that the process shown in FIG. 11 can be further extended to build batteries comprising multiple electrochemical cells. In some embodiments, multiple units shown in FIG. 11 can be stacked together to form a multi-cell structure. Then the multi-cell structure can be pressed from both ends (top and bottom as shown in FIG. 11) to form a multi-cell battery. In some embodiments, a multi-cell battery can be formed by repeatedly stacking one electrochemical cell over another. In this example, multiple electrochemical cells can be formed using the process illustrated in FIG. 11, then the resulting electrochemical cells are stacked together to form a battery.

In some embodiments, a multi-cell battery can be built in a cell-by-cell manner. In this case, one electrochemical cell can be formed using methods illustrated in FIG. 11. Then stack the raw materials (porous substrates, electrode materials, etc.) over the formed electrochemical cell, followed by pressing the raw materials against the formed electrochemical cell to form another cell. In some embodiments, a multi-cell battery can be built in an electrode-by-electrode manner. In this case, one electrode (either anode or cathode) can be formed using methods illustrated in FIGS. 10A-10B. Then raw materials of the opposite electrode can be disposed over the formed electrode, followed by pressing the raw materials against the formed electrode(s) to form another electrode. Repeating the process by alternatingly forming opposite electrodes can be used to build a multi-cell battery.

Example Electrochemical Cells Including Porous Current Collectors

Figure 12:
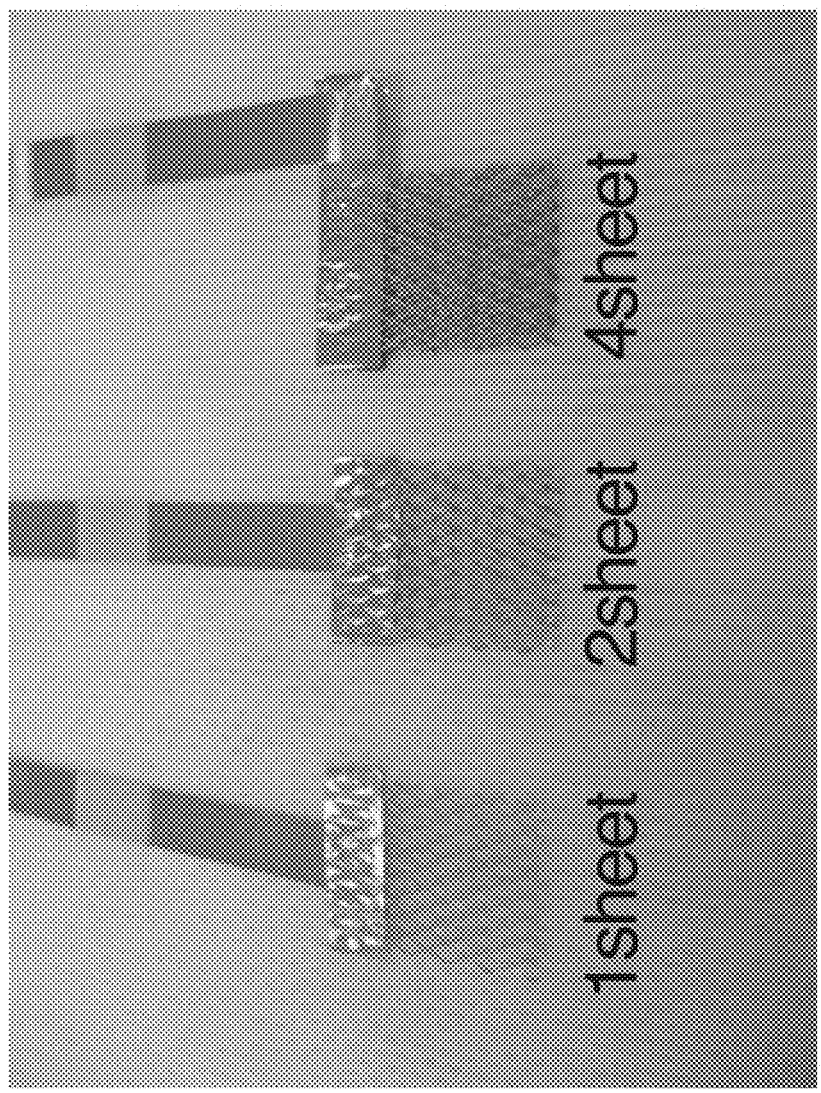
FIG. 12 is a photograph of three porous current collectors including wire meshes, according to various embodiments.

FIG. 12 shows photographs of three porous current collectors, containing one sheet, two sheets, and four sheets of wire meshes, respectively. The wire meshes used here are made of titanium. Wires in the meshes have a thickness of about 0.137 mm and a strand width of about 0.18 mm. The meshes are substantially rectangular, with a short side width of 12.5 mm. Openings of the meshes are substantially diamond shape with a dimension of 3.18 mm in the long direction and a dimension of about 1.27 mm in the short direction. The porosity is about 25%-45%, but can be extended to 20% to about 90% in practice. Openings of the wire meshes are substantially of diamond shape, with a pitch of about 0.12 mm.

The stacked wire meshes are bonded at one end by an aluminum foil. The bonding can be achieved via soldering, welding, gluing, or any other means known in the art. An aluminum tab is attached to the mesh stack to transfer charge carriers collected by the mesh stack out of the electrode materials. After stacking and compression, the resulting three electrodes, including the semi-solid electrode materials, have a thickness of about 0.59 mm, 0.595 mm, and 0.72 mm, respectively. The electrode thickness can be adjusted by changing the number of wire meshes used in the electrode, or by changing the compression force during the preparation of the electrodes.

In use, electrode thickness can be related to the performance of the battery. In general, as the discharge rate increases, a thinner, more porous electrode is preferred in order to meet transport rate requirements. However, at the same time, the decreased electrode thickness can also reduce the amount of active materials in the cell and hence reduce the energy capacity of the cell.

Figure 13:
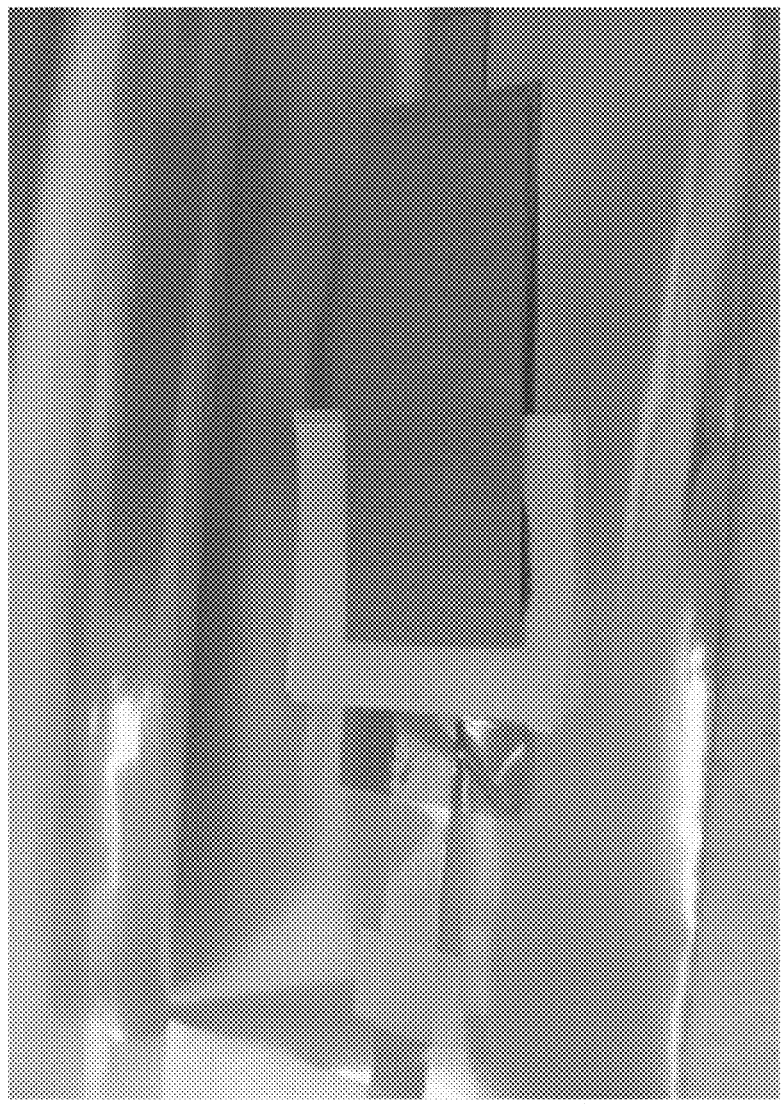
FIG. 13 is a photograph of an electrochemical cell using semi-solid electrodes, according to an embodiment.

FIG. 13 is a photograph of a unit electrochemical cell using electrodes prepared by the methods as described with reference to FIG. 10A-10B.

Figure 14A:
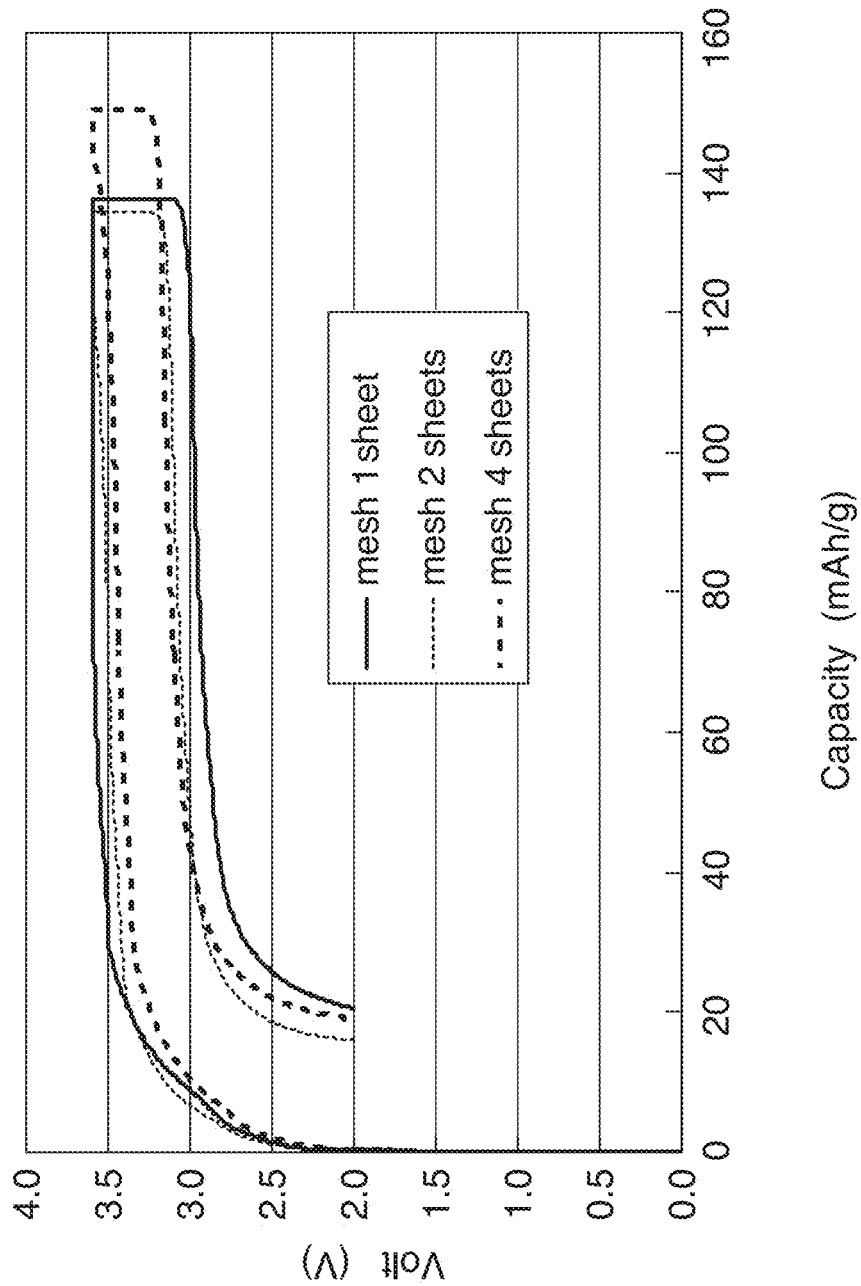
FIG. 14A illustrates a charge/discharge curve of battery cells that include semi-solid electrodes, according to various embodiments.

FIG. 14A shows a charge/discharge curve of battery cells including a semi-solid electrode using a porous current collector. Charging and discharging are carried out at a constant temperature of 25° C., and the charge/discharge rate is C/10. Current collectors comprising different number of wire meshes are presented for comparison. In general, using multi-mesh current collectors decrease the cut-off value of the capacity at which the output voltage drops sharply. In another word, batteries having a multi-mesh current collector can operate at a constant voltage output for a longer time. Moreover, in the plateau region of the curves, batteries having a multi-mesh current collector have a higher voltage during discharging and a lower voltage during charging, given the same capacity.

Figure 14B:
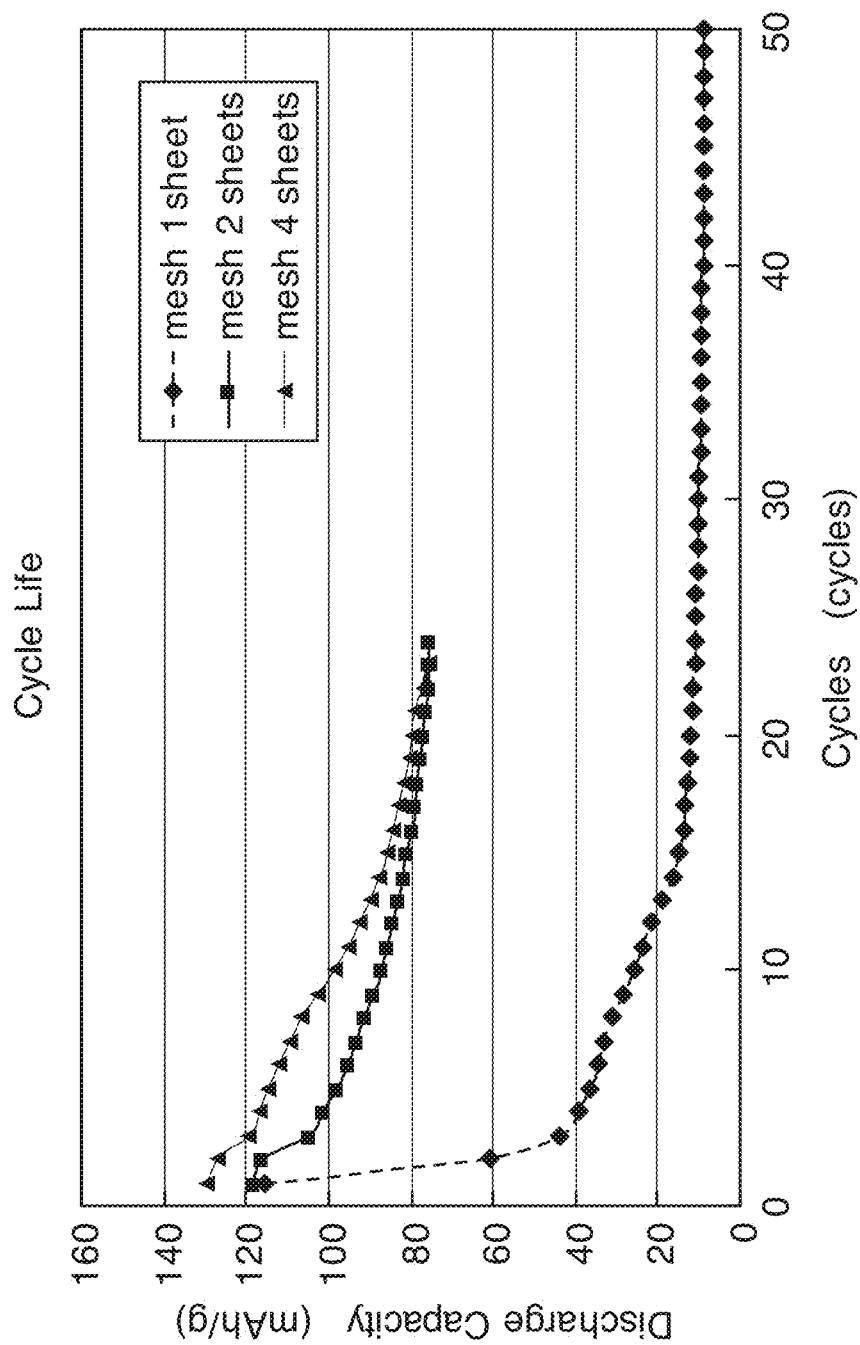
FIG. 14B illustrates the discharge capacity of battery cells after multiple charge and discharge cycles, according to various embodiments.

FIG. 14B shows the discharge capacity of the battery cells after multiple charge and discharge cycles. In general, the battery capacity decreases as the number of charge/discharge cycles increases, i.e., the battery degrades with cycle life. However, using a mesh stack (instead of a single mesh) as the current collector can slow down the degradation, as shown in FIG. 14B. After about 20 charge/discharge cycles, batteries using a mesh stack as the current collector have a capacity of about 80 mAh/g, while batteries using a single mesh current collector have less than 20 mAh/g remaining. Note that all these batteries have substantially the same capacity in the beginning of the test.

The degradation mitigation effect by using multi-mesh current collector can also be saturated as the number of meshes in the current collector increases. Notice that after about 20 cycles, the discharge curves of batteries having two meshes and batteries having four meshes cross each other, indicating that the two sets of batteries have roughly the same capacity at this point. Therefore, the number of meshes used for the current collector may have an optimum value, which can be dependent on both the mesh parameters (e.g., size, porosity, material, coating, etc.) and the electrode parameters (e.g., active material, electrode density, and porosity, etc.).

FIG. 14A and FIG. 14B together show that in general increasing the number of meshes in the current collector can decrease internal resistance, increase battery capacity, and improve rate capability. Without being bound by any theory or mode of operation, increasing the number of meshes increase the surface area of the current collector and decrease the average distance a charge carrier travels before reaching the current collector, both of which can contribute to a lower battery resistance. The increase in surface area of the current collector can also help increase the effective surface area of the electrode, where the electrochemical reaction occurs, therefore increasing the battery capacity. Rate capability can be defined as the maximum continuous or pulsed output current a battery can provide, and can be related to the power density of a battery. Increasing the number of meshes can improve the output power density by facilitating the charge transfer and therefore can also improve the battery rate capability.

Figure 15A:
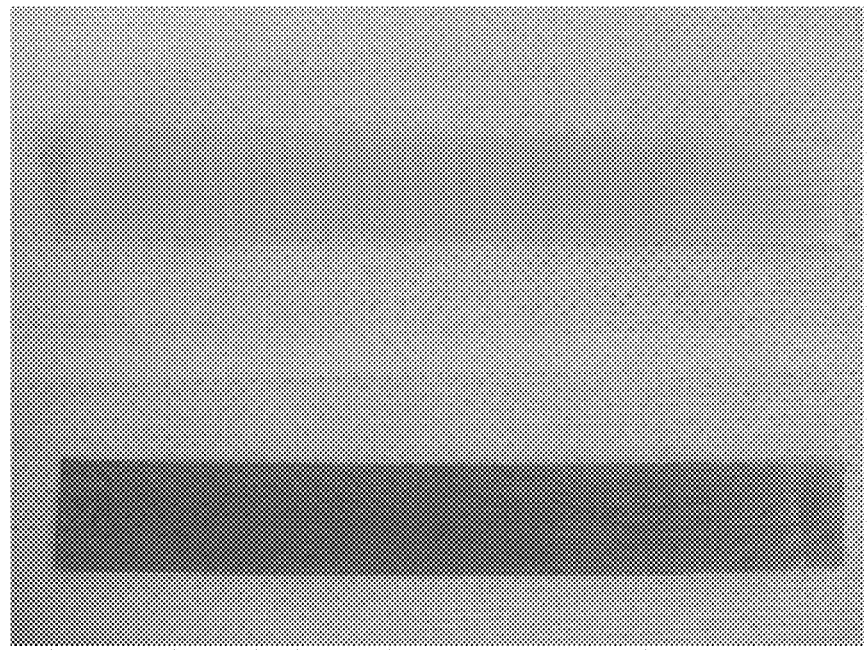
FIG. 15A-15B are photographs of aluminum mesh current collectors with and without a carbon coating on the surface, respectively, according to an embodiment.
Figure 15B:
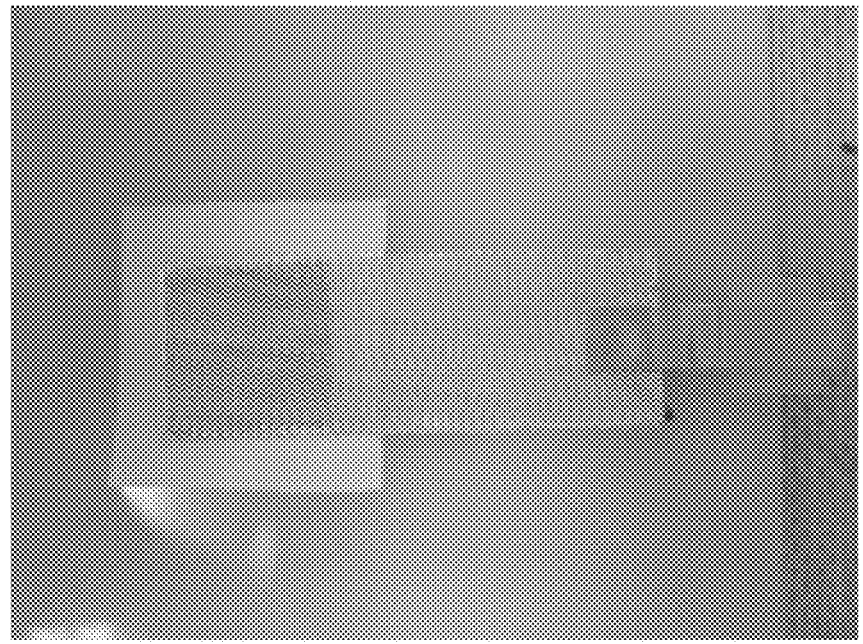

FIGS. 15A-15B are photographs of aluminum (Al) mesh current collectors with and without a carbon coating on the surface. FIG. 15A shows meshes with carbon coating (black) and without carbon coating (white). The meshes have a length of about 100 mm and a wide of about 12.5 mm. FIG. 15B shows a current collector made from the meshes shown in the top figure (without carbon coating). Notice that the resulting current collector includes selvage, also referred to as a finished edge, woven in continuously and forming a smooth edge running the periphery of the mesh. The selvage, in operation, can increase the stability of the mesh and provide a safety edge for handling. The current collector also includes an aluminum tab to facilitate charge transfer.

Figure 16:
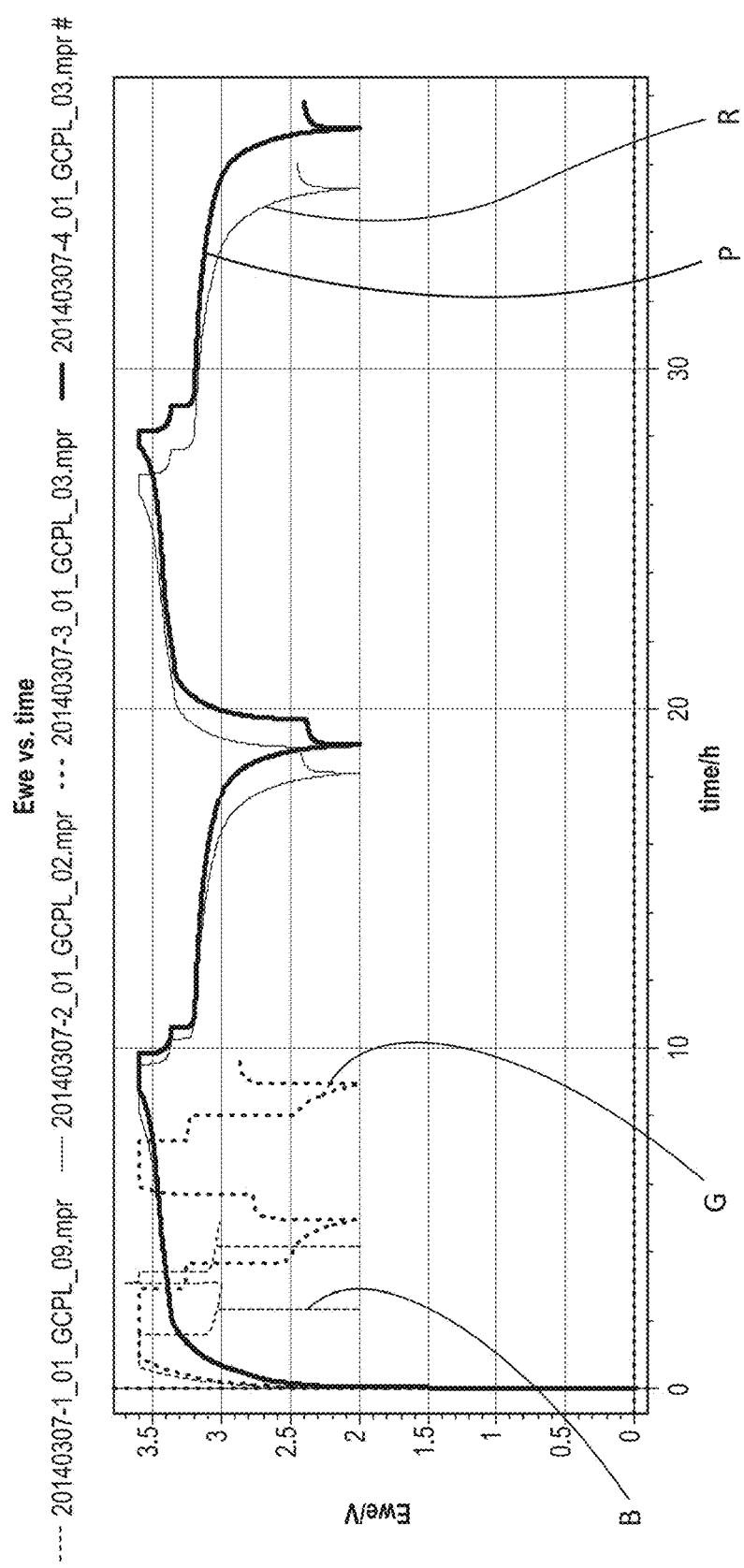
FIG. 16 illustrates an operation curve of battery cells having a porous current collector, according to various embodiments.

FIG. 16 is an operation curve of batteries having a current collector with and without a carbon coating. The curve shows the output voltage of the batteries with respect to time. It can be seen that using a carbon coating can increase the operation time during which the battery has a substantially stable output voltage. More specifically, batteries with a carbon coating on the current collector can keep delivering around a voltage between 3 to 3.5 volts for about 15 hours, while batteries without a carbon coating on the current collector can deliver similar voltages for only less than 5 hours. The red R and purple P lines show a current collector with a carbon coating, and the blue B and green G lines show a current collector without a carbon coating.

Figure 17:
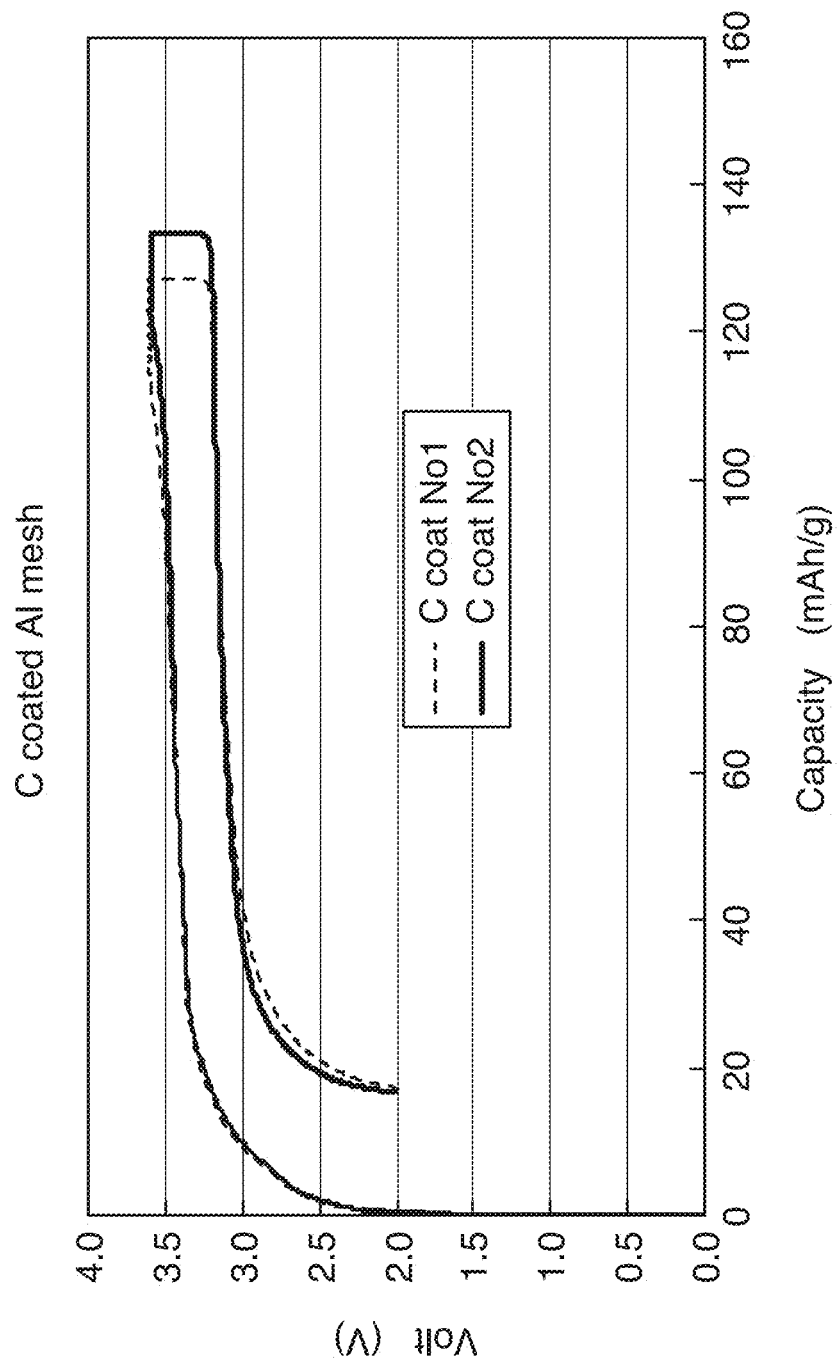
FIG. 17 illustrates discharge curves of battery cells with a carbon coating on the surface of the porous current collector, according to an embodiment.

FIG. 17 shows discharge curves of two batteries with a carbon coating on the surface of the current collector. The discharge curves illustrate that the batteries begin the plateau region (usually a desirable region in electrical applications) at around 30 mAh/g, and maintain the plateau shape of the discharge curves until more than 120 mAh/g.

Figure 18:
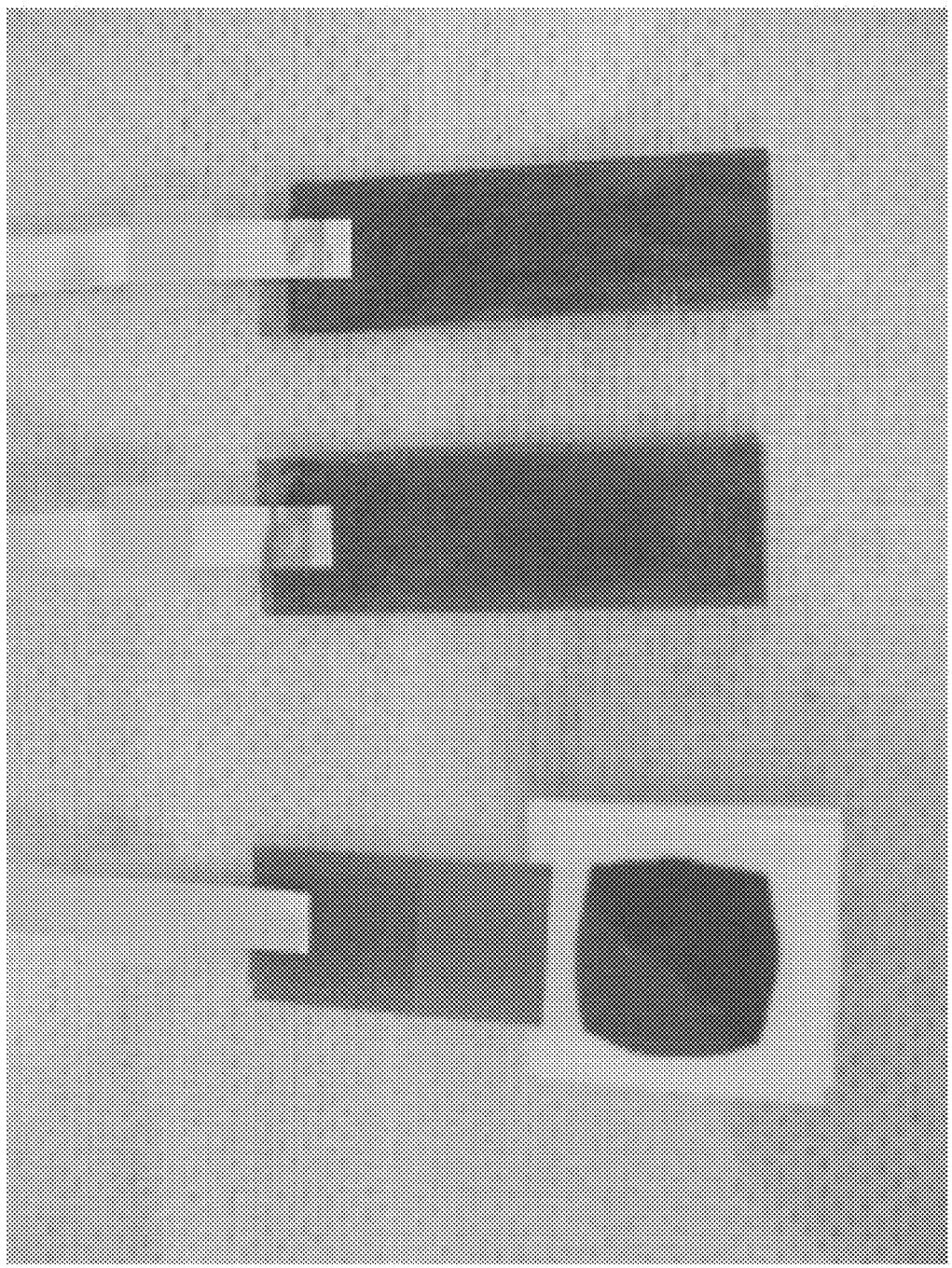
FIG. 18 is a photograph of current collectors including wire meshes that are coated with carbon, according to various embodiments.

FIG. 18 is a photograph of three current collectors comprising one sheet, two sheets, and three sheets of titanium wire meshes, respectively. The surfaces of the three current collectors are coated with carbon. Three electrochemical cells are constructed using these three current collectors.

The cathode in these three electrochemical cells includes 50% of an electrochemically active material (lithium iron phosphate, also referred to as LFP) and 0.8% of a conductive material (carbon black) suspended in 49.2% of an electrolyte. The anode includes 50% of mesophase graphite powder (MGP-A), 2% of Super C45 carbon black, and 48% of the same electrolyte used in the cathode. The electrolyte comprises 10 grams of EC-GBL (ethylene carbonate—gamma-butyrolactone), 0.5 gram of TOP, 2% of vinylene carbonate (VC) and 1.5% of lithium bis(oxalate)borate (LIBOB), wherein the EC:GBL ratio is 3:7. The resulting electrochemical cells are formed by 2 cycles of C/10 charge and discharge, in addition to 50 cycles of C/4 charge and discharge, all of which are carried out at a constant temperature of 25° C.

Figure 19:
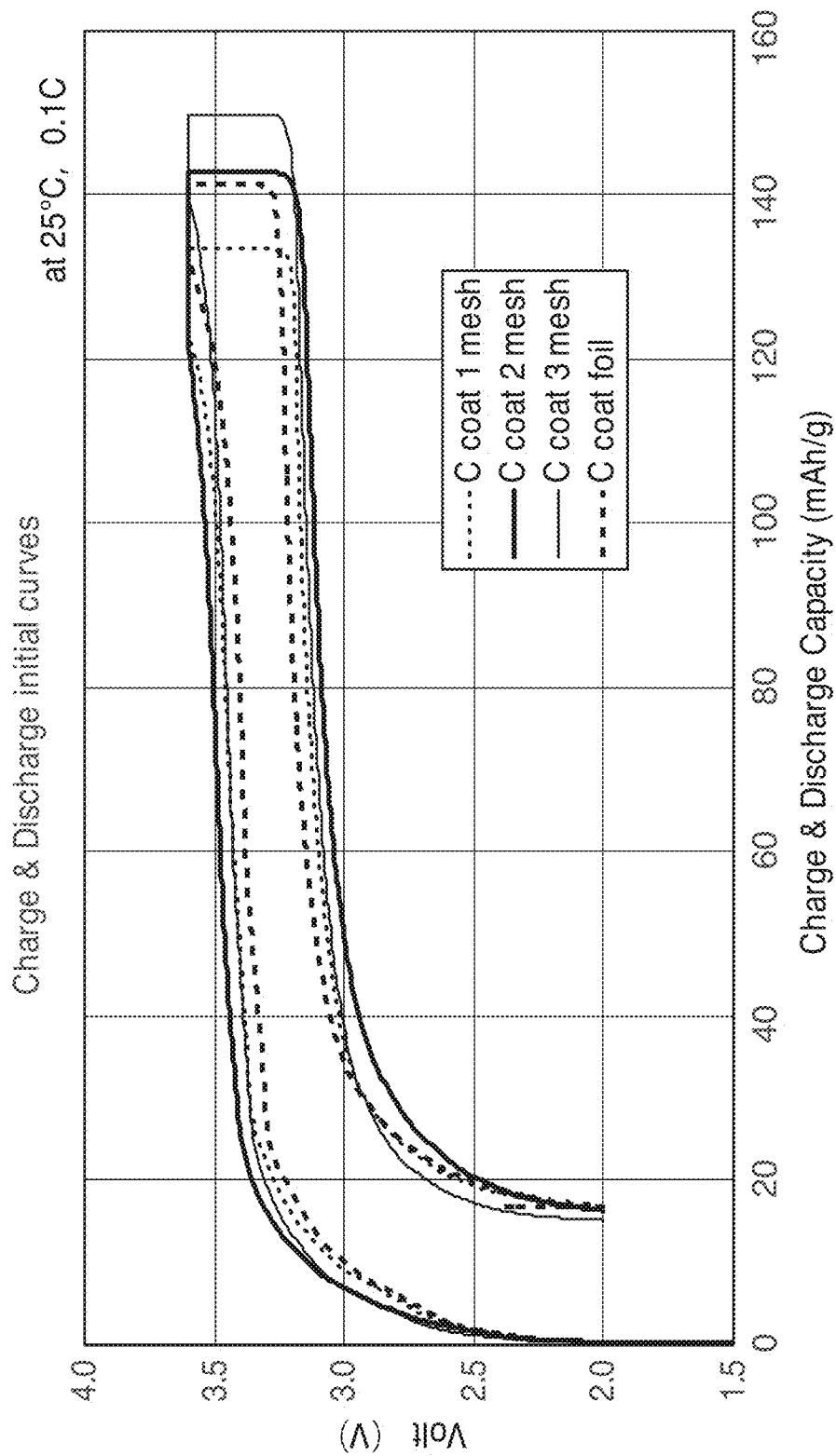
FIG. 19 illustrates discharge curves of battery cells incorporating the porous current collectors of FIG. 18, according to various embodiments.

FIG. 19 shows discharge curves, carried out at C/10 rate, of the three electrochemical cells using current collectors shown in FIG. 18. For comparison, a discharge curve of an electrochemical cell using a carbon coated titanium foil as the current collector is also presented. The measured charge capacity of the four electrochemical cells using one sheet, two sheets, three sheets of wire meshes and a foil as the current collector is 133, 143, 150, and 141 mAh/g, respectively. The measured discharge capacity is 117, 126, 135 and 125 mAh/g, respectively. It can be readily seen that stacking more than one wire meshes together as the current collector can noticeably increase the battery capacity.

Figure 20B:
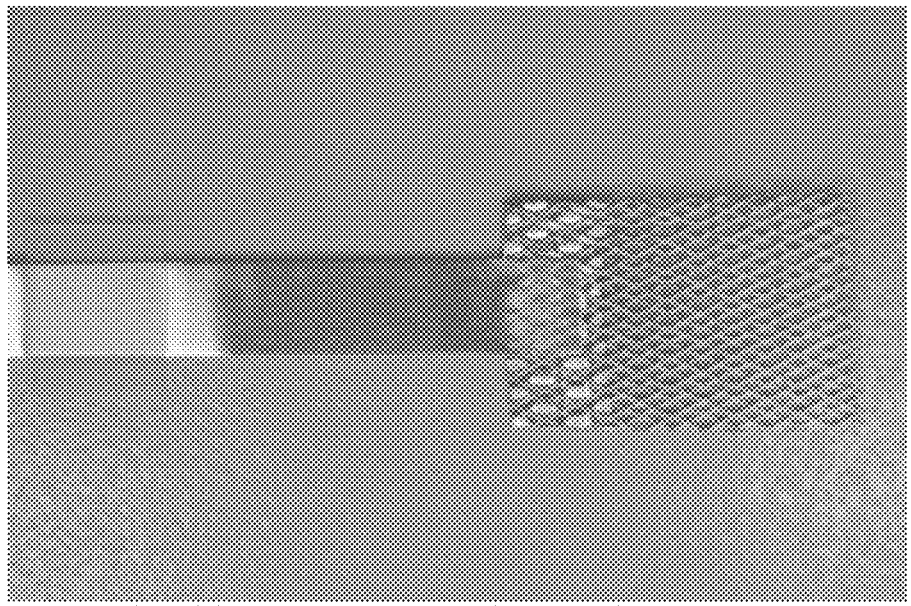
FIG. 20A-20B are photographs of current collectors that are made of Titanium meshes, according to various embodiments.
Figure 20A:
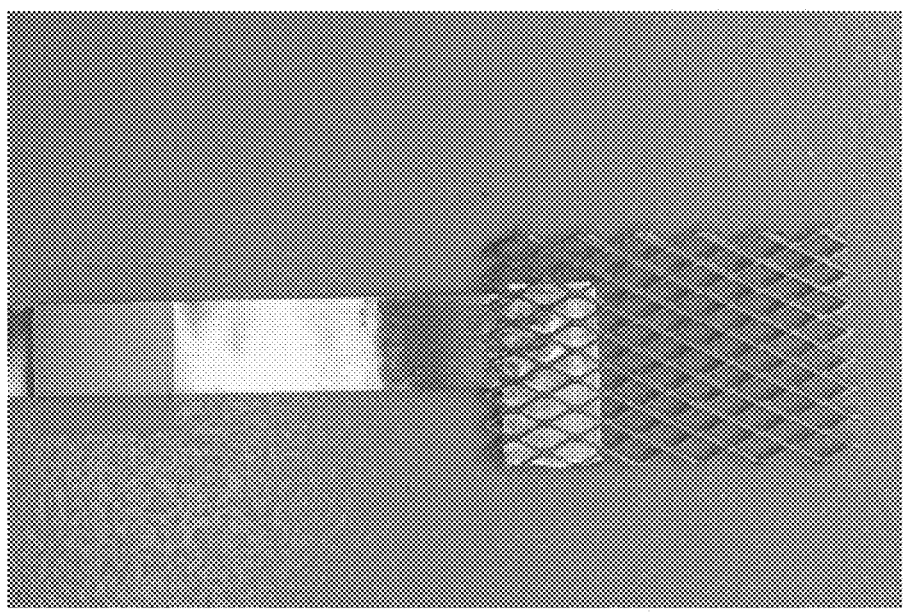

FIG. 20A-20B show photographs of two current collectors, both of which comprise two titanium meshes without carbon coating. FIG. 20A shows a current collector with the two wire meshes aligned in such a way that the openings in one mesh substantially overlap with those in the other. FIG. 20B shows a current collector, in which the two meshes are aligned such that the openings in one mesh are shifted by half a pitch with respect to openings in the other. The resulting current collector shows, at least visually, a smaller pitch. An aluminum tab is attached to each of the current collectors to facilitate charge transfer. Using these two current collectors, two electrochemical cells are made to test the effect of pitch shift between wire meshes on the performance of the resulting electrochemical cells.

Figure 21:
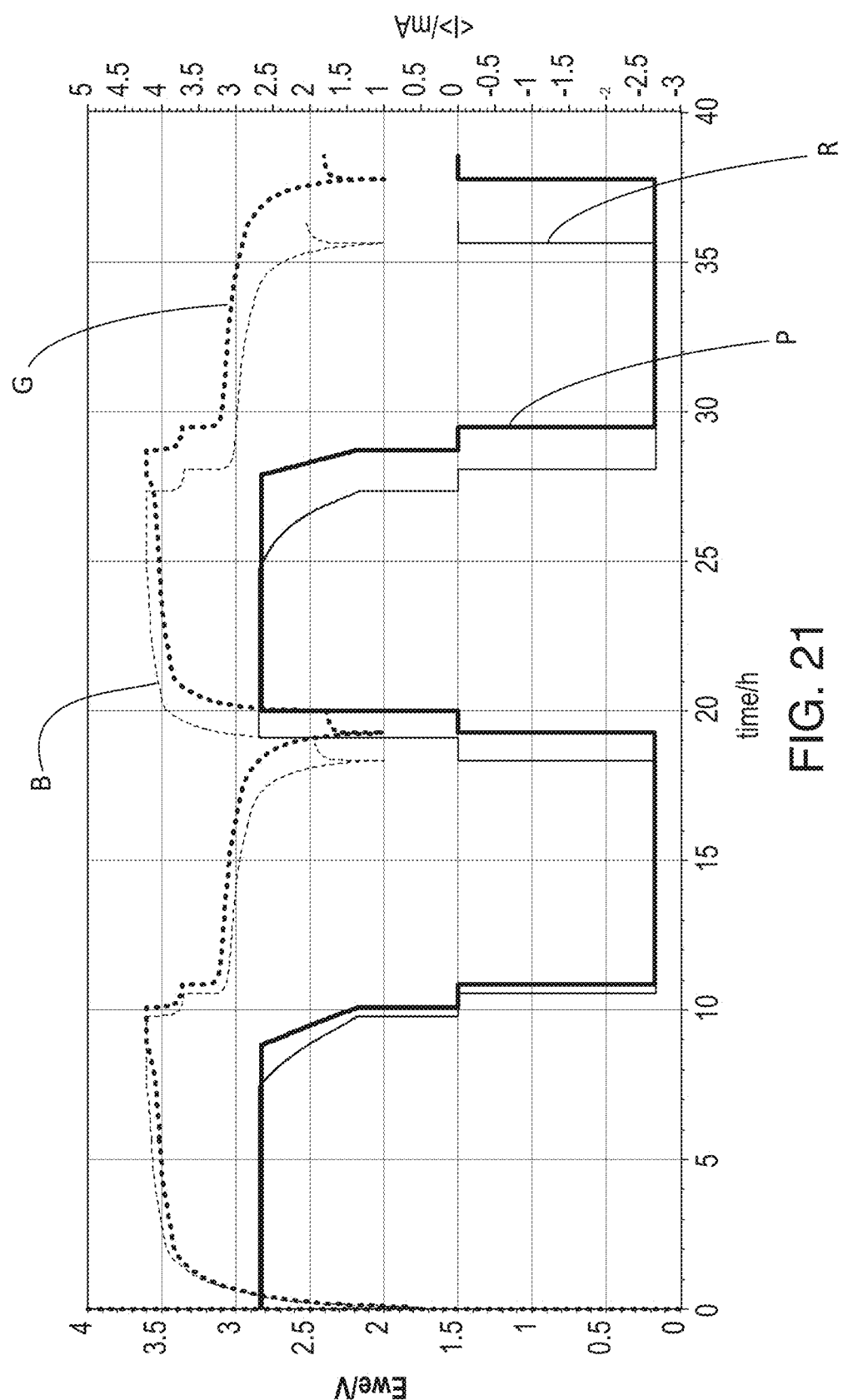
FIG. 21 illustrates performance curves of battery cells incorporating the porous current collectors of FIGS. 20A-20B, according to various embodiments.

FIG. 21 shows performance curves of two electrochemical cells using the two current collectors shown in FIG. 20A and FIG. 20B, respectively. The discharge curves show voltages and currents of the battery cells as a function of time during battery formation, which comprises repetitive charge and discharge cycles, carried out at C/10 rate and a constant temperature at 25° C. It can be readily seen that shifting one wire mesh by half a pitch with respect to the other wire mesh in the current collect can noticeably extend the time period during which the battery delivers a constant voltage and/or a constant current. For example, during the second cycle (after 20 hours), the battery with pitch shift in the current collector shows an end charge step at hour 29, while the battery without any pitch shift in the current collector shows the same voltage drop at hour 27. The current drop of the battery with pitch shift in the current collector occurs at hour 28, while similar drop occurs in the other battery at hour 25. Only two cycles are shown here, and it can be reasonably expected that with the accumulation of cycles, the advantage of pitch shift would be more pronounced. The green G and purple P lines show a battery with pitch shift, and the blue B and red R lines show a battery without pitch shift. The green G and blue B lines show voltage, and the red R and purple P show current.

Figure 22:
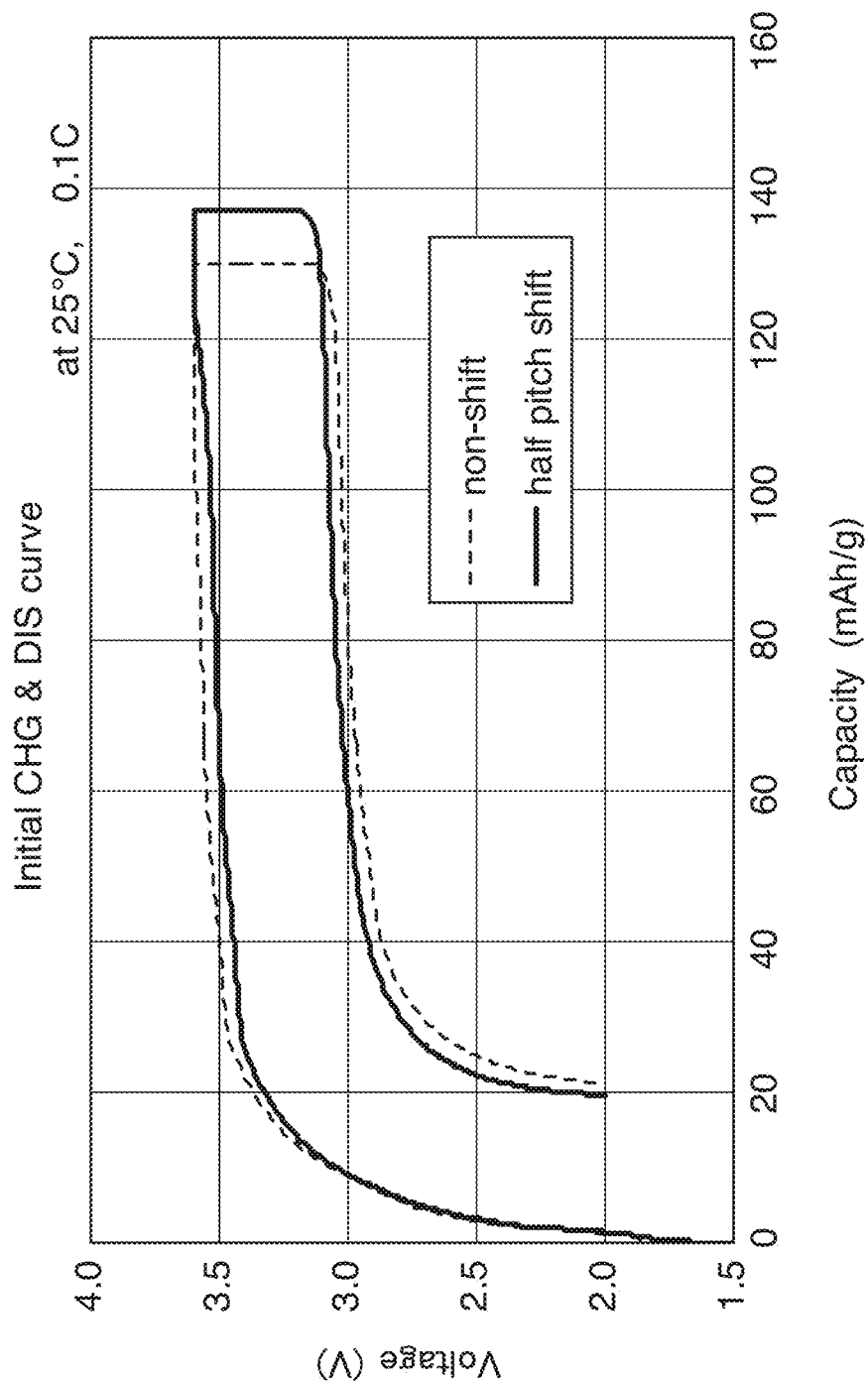
FIG. 22 illustrates discharge curves of battery cells incorporating the porous current collectors of FIGS. 20A-20B, according to various embodiments.

FIG. 22 shows discharge curves of the same two electrochemical cells shown in FIG. 16. The performance improvement by shifting the wire meshes in the current collector can be readily observed. For example, the measured charge capacity of the electrochemical cell with pitch shift is 137.2 mAh/g. For comparison, the capacity of the cell without pitch shift is 130.2 mAh/g. The discharge capacity of the pitch shifted cell is 117.6 mAh/g, and the corresponding value of the cell without pitch shift is 109.0 mAh/g.

Moreover, the Ah efficiency, which can be defined as the ratio of discharge capacity to charge capacity, of the pitch shifted cell is also superior over the pitch aligned cell. Quantitatively, the Ah efficiency of pitch shifted cell is 85.7%, comparing to 83.7% of the pitch aligned cell. The comparison of the Ah efficiency can also be readily observed in the figure by the capacity difference between the two plateau regions in the charge and discharge sections of the curve. The smaller capacity difference between the two plateau regions shows a better Ah efficiency.

While various embodiments have been described above, it should be understood that they have been presented by way of example only, and not limitation. For example, while the embodiments herein describe electrochemical devices such as, for example, lithium ion batteries, the systems, methods and principles described herein are applicable to all devices containing electrochemically active media. Said another way, any electrodes and/or devices including at least an active material (source or sink of charge carriers), an electrically conducting additive, and an ionically conducting media (electrolyte) such as, for example, batteries, capacitors, electric double-layer capacitors (e.g., ultracapcitors), pseudo-capacitors, etc., are within the scope of this disclosure. Furthermore, the embodiments can be used with non-aqueous and/or aqueous electrolyte battery chemistries.

Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially as described above. Additionally, certain steps may be partially completed and/or omitted before proceeding to subsequent steps.

While various embodiments have been particularly shown and described, various changes in form and details may be made. For example, although various embodiments have been described as having particular features and/or combinations of components, other embodiments are possible having any combination or sub-combination of any features and/or components from any of the embodiments described herein. The specific configurations of the various components can also be varied.

The invention claimed is:
1. An electrode, comprising:
   a first porous substrate defining a first pitch and a second porous substrate defining a second pitch stacked together to form a current collector; and
   a semi-solid electrode material embedded in the first and second porous substrates, the semi-solid electrode material including a suspension of an active material and a conductive material in a non-aqueous liquid electrolyte,
   whereby the stacking of the first porous substrate and the second porous substrate reduces an internal resistance of an electrochemical cell including the electrode.
2. The electrode of claim 1, wherein the first porous substrate in the current collector is shifted by about 30% to about 70% of the first pitch relative to the second porous substrate in the current collector.
3. The electrode of claim 1, wherein the first pitch is different from the second pitch.
4. The electrode of claim 1, wherein the first pitch is substantially the same as the second pitch.
5. The electrode of claim 1, wherein the first porous substrate in the current collector is spaced a non-zero distance from the second porous substrate in the current collector.
6. The electrode of claim 5, wherein the non-zero distance is at least about 50 μm.
7. The electrode of claim 1, wherein the first porous substrate in the current collector is substantially rigid and the second porous substrate is flexible.

8. The electrode of claim 5, wherein the first porous substrate is conformally attached to the second porous substrate.

9. The electrode of claim 1, wherein at least one of the first porous substrate and the second porous substrate in the current collector includes a surface treatment to enhance bonding with the semi-solid electrode material.

10. The electrode of claim 9, wherein the surface treatment is a texture to increase the surface area of the current collector.

11. The electrode of claim 1, further comprising:
a third porous substrate defining a third pitch stacked together with the first porous substrate and the second porous substrate to form the current collector, the first, second, and third pitches collectively forming a geometric sequence.

12. The electrode of claim 1, wherein at least one of the first pitch and the second pitch in the current collector is about 200 µm to about 2 mm.

13. The electrode of claim 1, having a thickness in the range of about 50 µm to about 2 mm.

14. The electrode of claim 13, having a thickness in the range of about 100 µm to about 1 mm.

15. The electrode of claim 14, having a thickness in the range of about 200 µm to about 500 µm.

16. The electrode of claim 13, having a thickness in the range of about 50 µm to about 1 mm.

17. The electrode of claim 16, having a thickness in the range of about 100 µm to about 500 µm.

18. The electrode of claim 17, having a thickness in the range of about 200 µm to about 300 µm.

* * * * *